(12) United States Patent
Louis et al.

(10) Patent No.: US 10,336,443 B2
(45) Date of Patent: Jul. 2, 2019

(54) RETRACTABLE AND DEPLOYABLE FLIGHT ROTOR SYSTEM

(71) Applicant: Bell Helicopter Textron Inc., Fort Worth, TX (US)

(72) Inventors: Matthew E. Louis, Fort Worth, TX (US); Michael John Ryan, Colleyville, TX (US); Daniel B. Robertson, Southlake, TX (US); Frank B. Stamps, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 221 days.

(21) Appl. No.: 15/627,373

(22) Filed: Jun. 19, 2017

(65) Prior Publication Data
US 2018/0362154 A1 Dec. 20, 2018

(51) Int. Cl.
| | | |
|---|---|---|
| *B64C 11/28* | (2006.01) | |
| *B64C 27/30* | (2006.01) | |
| B64C 27/48 | (2006.01) | |
| B64C 27/26 | (2006.01) | |
| B64C 27/28 | (2006.01) | |
| B64C 27/37 | (2006.01) | |

(52) U.S. Cl.
CPC .............. *B64C 27/30* (2013.01); *B64C 11/28* (2013.01); *B64C 2201/108* (2013.01); *B64C 2201/165* (2013.01)

(58) Field of Classification Search
CPC ......... B64C 27/22; B64C 27/48; B64C 27/26; B64C 27/28; B64C 27/37; B64C 27/30; B64C 27/50; B64C 11/28; B64C 2201/105; B64C 2201/165
See application file for complete search history.

(56) References Cited

U.S. PATENT DOCUMENTS

| | | | |
|---|---|---|---|
| 1,125,935 A | 1/1915 | Bendix | |
| 1,172,864 A | 2/1916 | Bendix | |
| 6,622,962 B1 * | 9/2003 | White | B64C 27/26 244/12.3 |

(Continued)

FOREIGN PATENT DOCUMENTS

| | | |
|---|---|---|
| CN | 109131865 A | 1/2019 |
| EP | 341818 A1 | 12/2018 |
| WO | 2016200963 A1 | 12/2016 |

OTHER PUBLICATIONS

EPO Search Report for EP Application No. 18177137.9 dated Oct. 24, 2018, 4 pages.

(Continued)

*Primary Examiner* — Richard A Edgar
(74) *Attorney, Agent, or Firm* — Patent Capital Group

(57) ABSTRACT

In one embodiment, an apparatus comprises a shaft, a rotor, and a cam surface. The shaft comprises a spiral spline along a length of the shaft. The rotor comprises a blade extending from the rotor and a tubular hole extending into the rotor. The tubular hole comprises a spiral groove configured to mate with the spiral spline on the shaft. Relative rotation between the spiral spline and the spiral groove causes the rotor to linearly move along the shaft. The cam surface comprising a recession. The blade nesting in the recession to constrains rotation of the rotor about the shaft and allows linear movement of the rotor along the shaft.

20 Claims, 20 Drawing Sheets

(56) References Cited

U.S. PATENT DOCUMENTS

| | | | |
|---|---|---|---|
| 6,937,122 B2 | 8/2005 | Ho et al. | |
| 9,120,560 B1 * | 9/2015 | Armer | B64C 27/26 |
| 9,409,642 B1 * | 8/2016 | Pingree | B64C 11/28 |
| 10,183,744 B2 * | 1/2019 | Gamble | B64C 27/30 |
| 2012/0280091 A1 | 11/2012 | Saiz | |
| 2015/0136897 A1 | 5/2015 | Siebel et al. | |

OTHER PUBLICATIONS

EPO Examination Report for EP Application No. 18177137.9 dated Nov. 8, 2018, 5 pages.

* cited by examiner

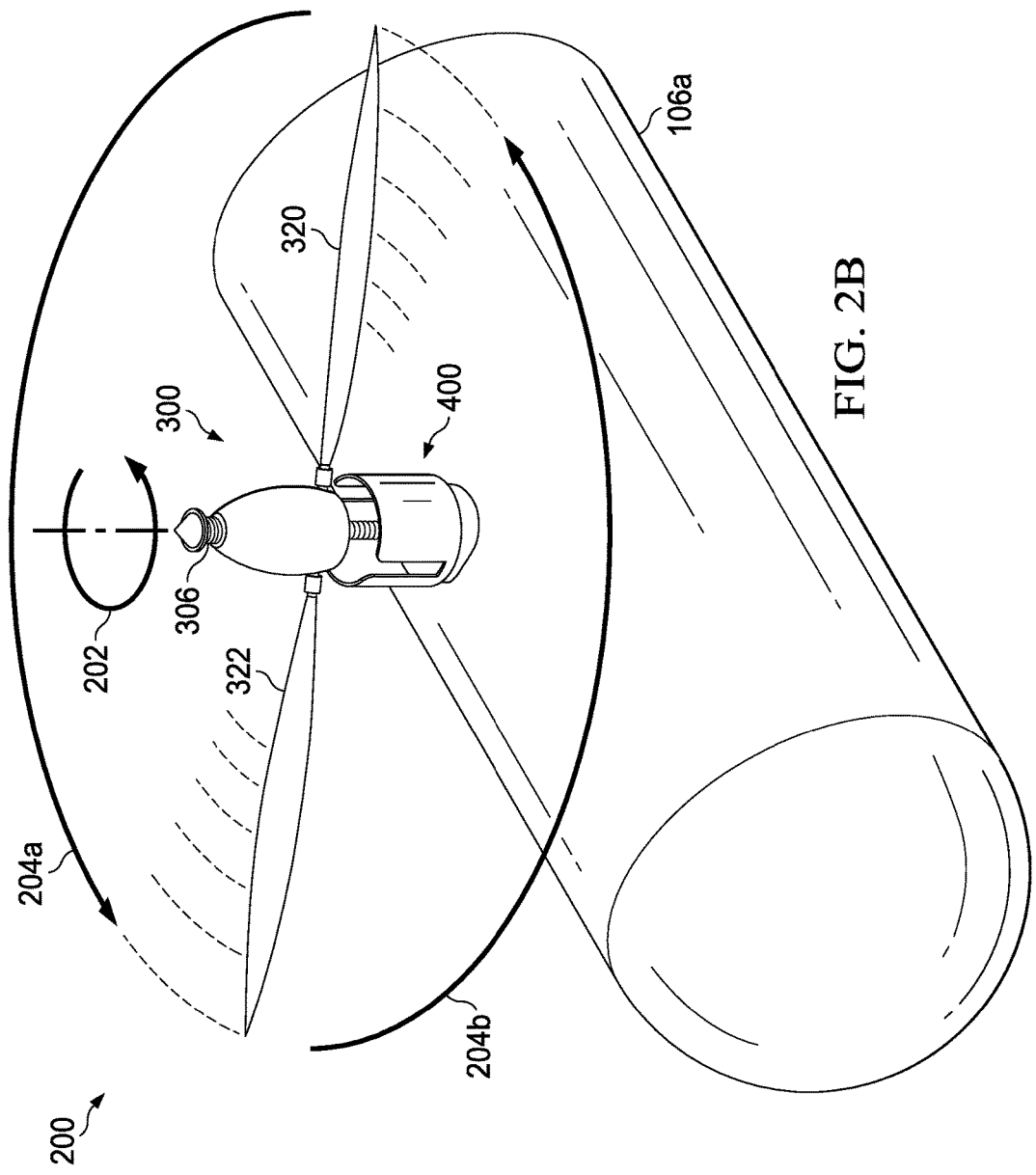

RETRACTABLE AND DEPLOYABLE FLIGHT ROTOR SYSTEM

TECHNICAL FIELD

This disclosure relates generally to aircraft performance, and more particularly, though not exclusively, to flight rotor systems to improve the performance of the aircraft.

BACKGROUND

Aircraft are subjected to various aerodynamic and operational forces during operation including, e.g., lift, drag, and thrust. In certain circumstances, the aerodynamic forces may increase the structural load on components of the aircraft. In general, the aerodynamic forces may be caused by airflow around the aircraft (and components thereon) while the aircraft is in motion. For example, any components that protrude from the fuselage, booms, wings, or other aerodynamic surfaces of the aircraft can disrupt the airflow and increase drag on the aircraft during flight. Excessive drag forces during operation of an aircraft are undesirable and potentially harmful to the aircraft, as they can negatively impact the structural integrity, mechanical integrity, and performance of the aircraft. For example, drag forces can cause the components of an aircraft to bend and may reduce the structural integrity and fatigue life of the aircraft. Moreover, drag forces counteract the thrust needed for (forward and/or vertical) flight of the aircraft and reduce the maximum speed and/or fuel efficiency of the aircraft.

SUMMARY

According to one aspect of the present disclosure, an apparatus comprises a shaft, a rotor, and a cam surface. The shaft comprises a spiral spline along a length of the shaft. The rotor comprises at least one blade extending from the rotor and a tubular hole extending into the rotor. The tubular hole comprises a spiral groove configured to mate with the spiral spline on the shaft. Relative rotation between the spiral spline and the spiral groove causes the rotor to linearly move along the shaft. The cam surface comprises at least one recession. The at least one blade nesting in the at least one recession constrains rotation of the rotor about the shaft and allows linear movement of the rotor along the shaft.

BRIEF DESCRIPTION OF THE DRAWINGS

FIGS. 2A and 2B illustrate an isometric view of a portion of an aircraft including a retractable and deployable flight rotor system according to the present specification.

DETAILED DESCRIPTION

Figure 1A:
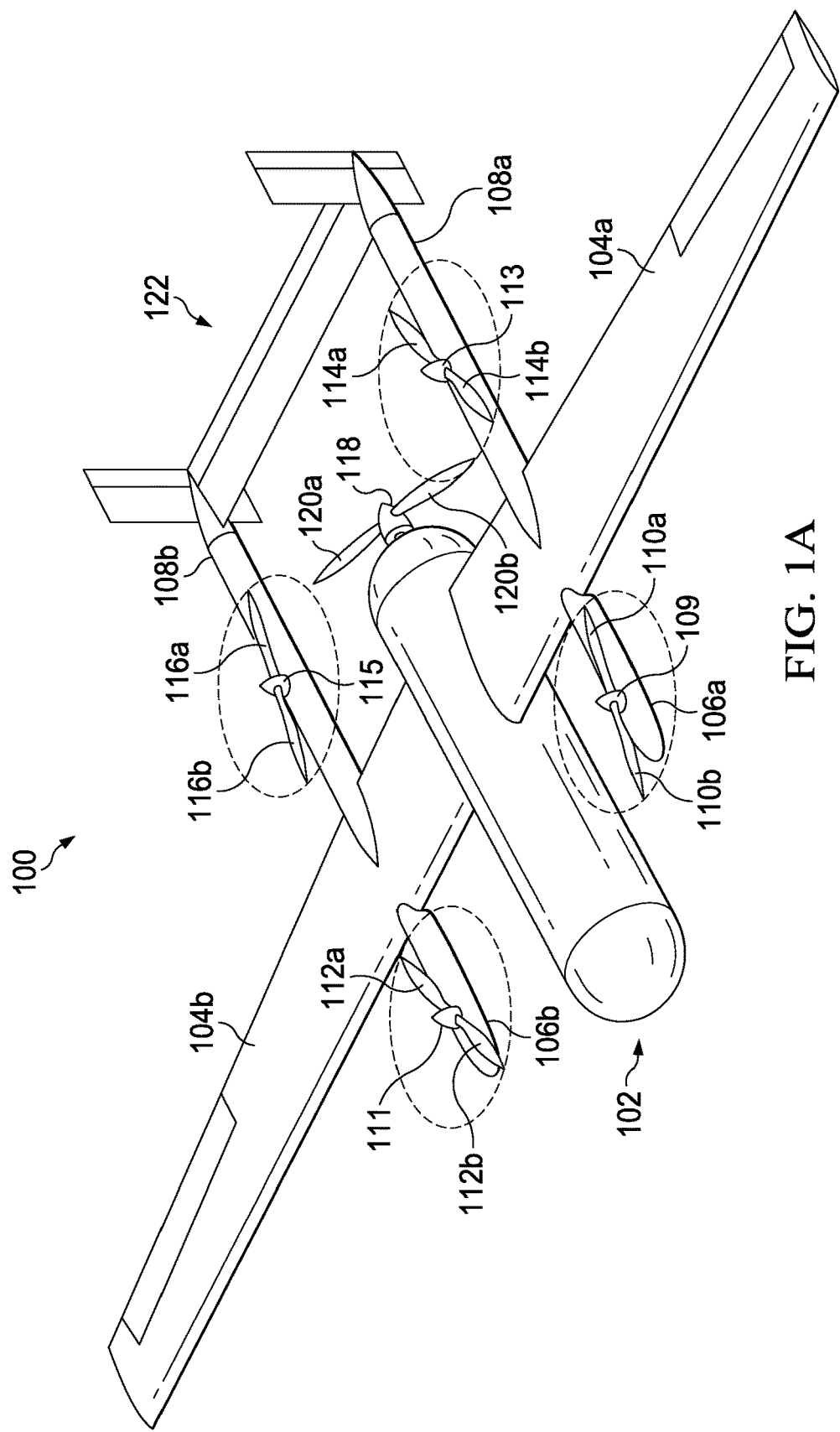
FIGS. 1A, 1B, 1C and 1D illustrate various views of an aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "vertical," "horizontal," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not, in itself, dictate a relationship between the various embodiments and/or configurations discussed.

Example embodiments that may be used to implement the features and functionality of this disclosure will now be described with more particular reference to the attached FIGURES.

FIGS. 1A, 1B, 1C and 1D illustrate views of an aircraft 100 in accordance with certain embodiments. In this example, the aircraft 100 is a vertical take-off and landing ("VTOL") aircraft. The VTOL aircraft 100 comprises a fuselage 102, a left wing 104a, and a right wing 104b. Each of the wings 104a and 104b extends from the fuselage 102. The fuselage 102 is coupled to a forward thrust rotor 118. The forward thrust rotor 118 rotates the blades 120a and 120b to provide forward thrust to the VTOL aircraft 100 for forward flight. Each of the wings 104a and 104b supports a forward boom and an aft boom. The left wing 104a supports a left forward boom 106a and a left aft boom 108a. The right wing 104b supports a right forward boom 106b and a right aft boom 108b. The left aft boom 108a and the right aft boom 108b support the tail assembly 122. Each of the booms supports a vertical thrust rotor; the VTOL aircraft 100 comprises four vertical thrust rotors, i.e., rotors 109, 111, 113, and 115. Each vertical thrust rotor provides vertical thrust to the VTOL aircraft 100 for vertical take-off and/or vertical landing. Each rotor supports and rotates one or more blades to generate thrust. The rotor 109 rotates blades 110*a* and 110*b*. The rotor 111 rotates blades 112*a* and 112*b*. The rotor 113 rotates blades 114*a* and 114*b*. The rotor 115 rotates blades 116*a* and 116*b*. The rotor 118 rotates blades 120*a* and 120*b*. Each of the rotors is coupled to a separate motor that applies a torque to the rotor.

The VTOL aircraft 100 is capable of vertical take-off and landing and forward flight based on operating the vertical thrust rotors 109, 111, 113, and 115 and the forward thrust rotor 118, respectively. Turning to FIG. 1A, FIG. 1A illustrates and isometric view of the VTOL aircraft 100 in a state of vertical take-off or vertical landing. In this state, each of the vertical thrust rotors 109, 111, 113, and 115 is actively providing vertical thrust to maintain vertical flight of the VTOL aircraft 100 (as generally indicated by dashed lines tracing a rotation of the blades). In this state, the VTOL aircraft 100 is not in forward flight. Therefore, the forward thrust rotor 118 is inactive and is not providing forward thrust to the VTOL aircraft 100.

Figure 1B:
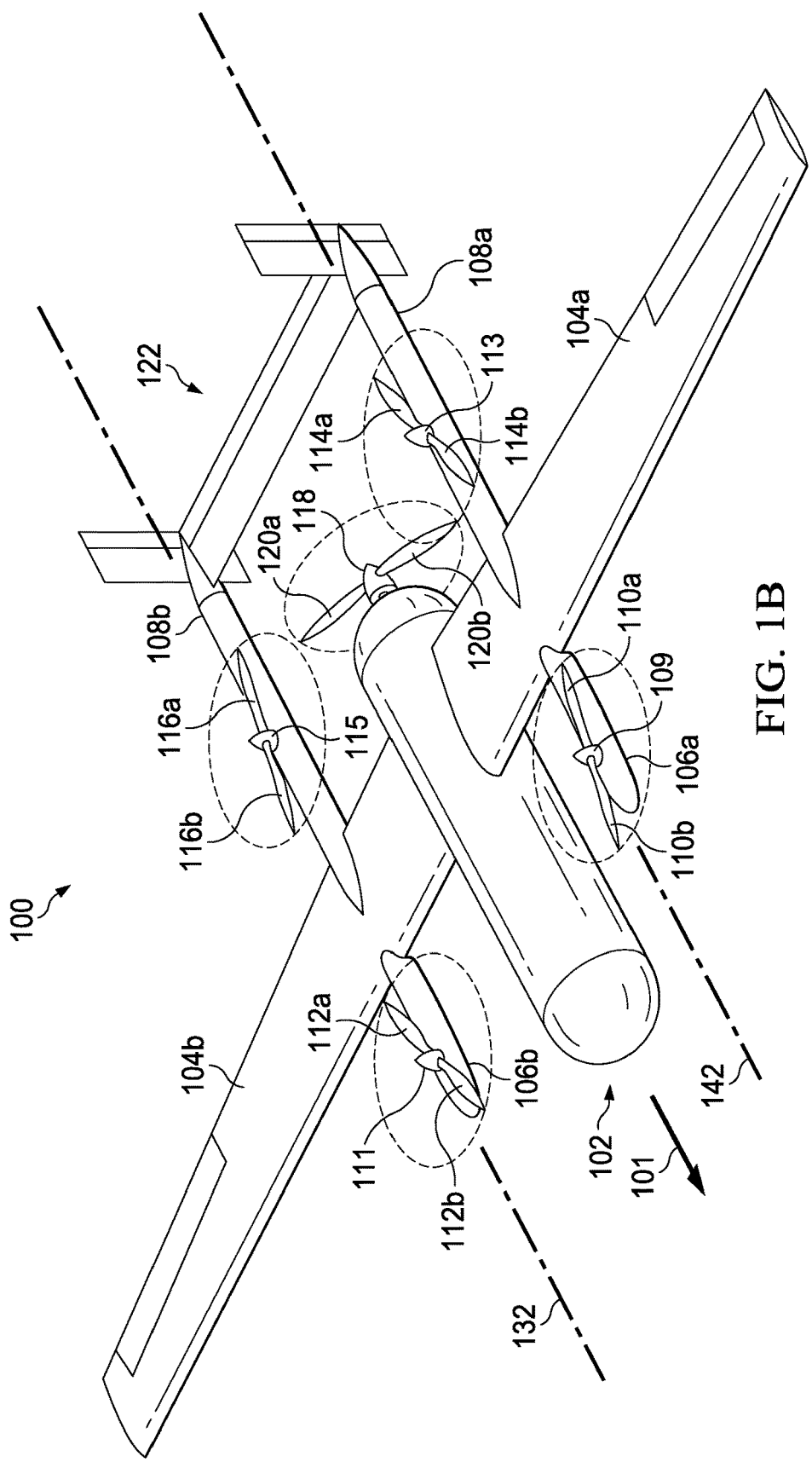
Figure 1C:
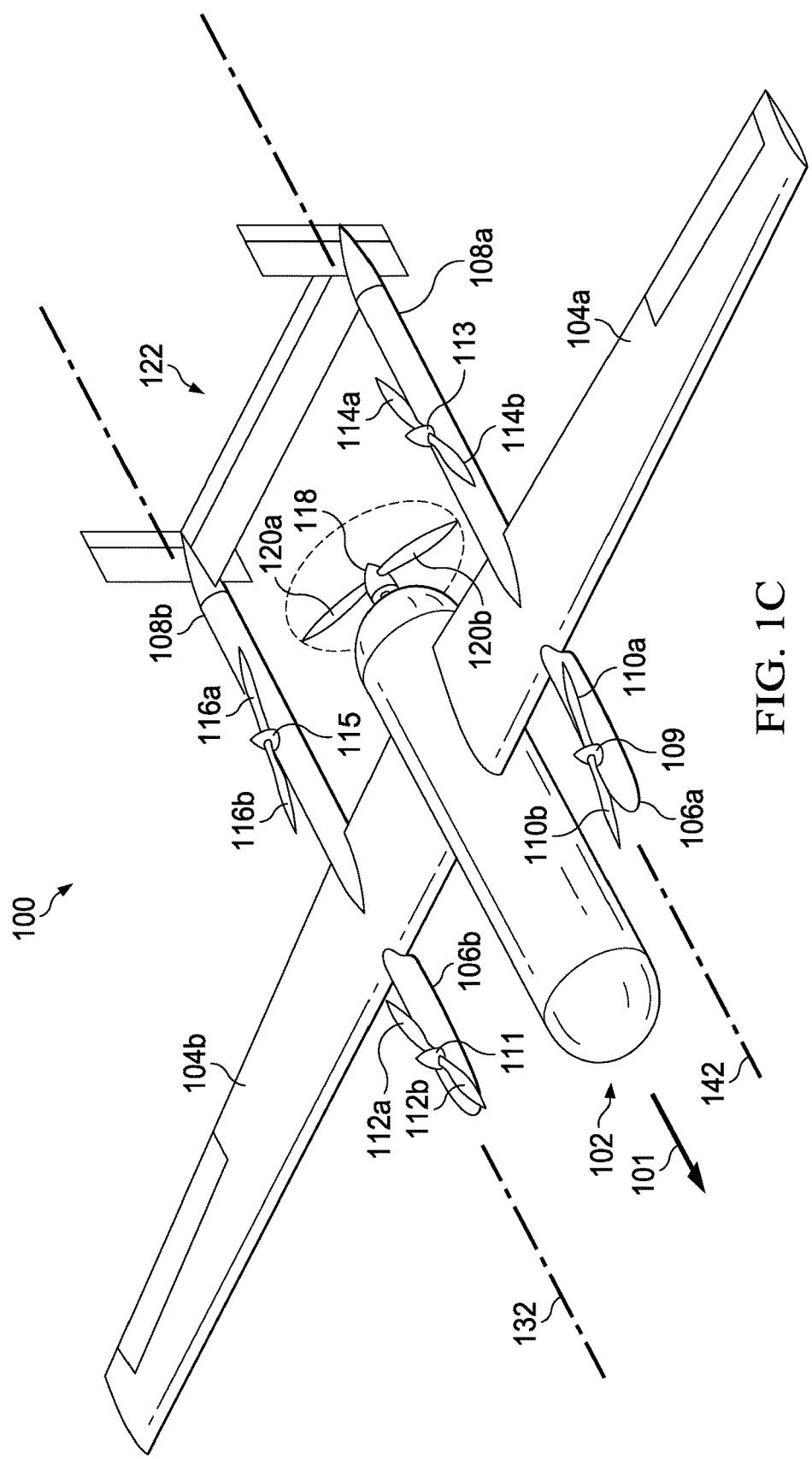

Turning to FIG. 1B, FIG. 1B illustrates an isometric view of the VTOL aircraft 100 in a state of transition between vertical take-off (or landing) and forward flight. In this state, the VTOL aircraft 100 is in a combination of forward flight and vertical take-off or landing. Thus, all of the four vertical thrust rotors 109, 111, 113, and 115 and the forward thrust rotor 118 are actively providing thrust to the VTOL aircraft 100. For example, this may be the state as the VTOL aircraft 100 transitions from forward flight (e.g., as illustrated in FIG. 1C) to vertical landing (e.g., as illustrated in FIG. 1A) and/or as the VTOL aircraft 100 transitions from vertical take-off (e.g., as illustrated in FIG. 1A) to forward flight. Axis 132 passes through a center of the booms 106*b* and 108*b*; axis 142 passes through the center of the booms 106*a* and 108*a*. Each of the axes 132 and 142 is aligned with (e.g., parallel to) a direction of forward flight of the VTOL aircraft 100.

Turning to FIG. 1C, FIG. 1C illustrates the VTOL aircraft 100 in a state of forward flight. In this state, the forward thrust rotor 118 is actively providing thrust to maintain forward flight of the VTOL aircraft 100 (as generally indicated by dashed lines tracing a rotation of the blades). Because the VTOL aircraft 100 is not in vertical flight, each of the vertical thrust rotors 109, 111, 113, and 115 is inactive and is not providing vertical thrust to the VTOL aircraft 100.

Figure 1D:
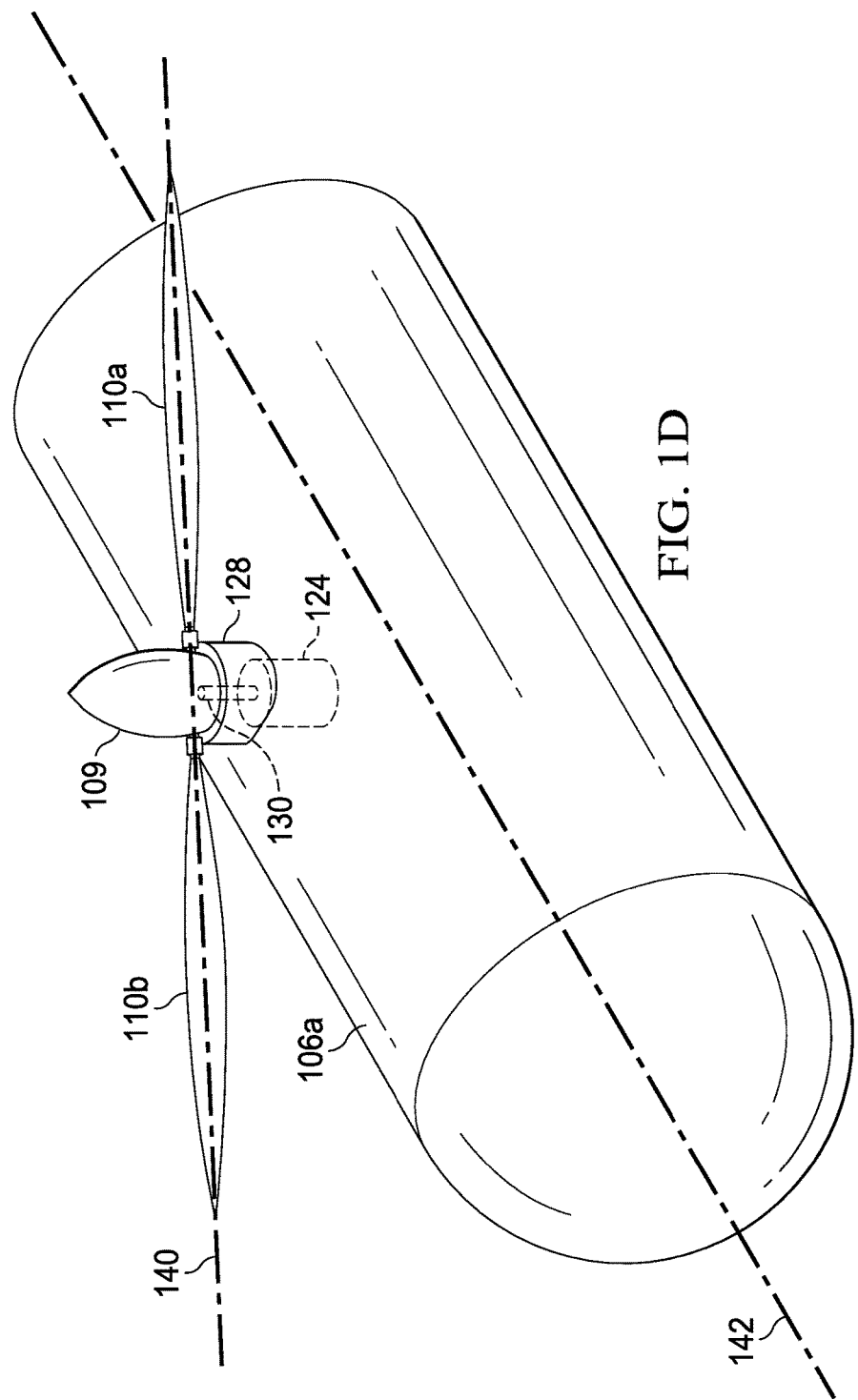

Turning to FIG. 1D, FIG. 1D illustrates a detail of a portion of the vertical thrust rotor system supported by the forward boom 106*a* of the VTOL aircraft 100 of FIGS. 1A, 1B, and 1C. A driveshaft 130 extends through a pylon 128 to couple to the rotor 109 to a motor 124. The motor 124, when operated, applies torque to the driveshaft 130, which rotates the rotor 109 and the blades 110*a* and 110*b* to generate vertical thrust. In FIG. 1D, the motor 124 is deactivated and the vertical thrust rotor 109 and the blades 110*a* and 110*b* are at rest and are not providing vertical thrust (e.g., due to the VTOL aircraft 100 being in forward flight). When the motor 124 is deactivated, the blades 110*a* and 110*b* come to rest at a seemingly arbitrary rotational position (or a location that cannot be easily prescribed). An axis 140 extends though the blades 110*a* and 110*b* (at an approximate centerline of the blades) and illustrates the rotational position of the blades 110*a* and 110*b*. In the rotational position depicted in FIG. 1D, the axis 140 of the blades 110*a* and 110*b* at rest and the axis of forward flight 142 of the VTOL aircraft 100 are misaligned by a relative angle of about 30 degrees (i.e., using a center of the rotor 109 as the origin).

Any component that extends from the VTOL aircraft 100 will produce drag while the VTOL aircraft 100 is in motion. In general, drag is an aerodynamic force that is directly proportional to the surface area of the aircraft (including the surface area of all components on the exterior of the aircraft). For example, as the surface area of an aircraft increases, the drag experienced by the aircraft also increases (e.g., tripling the surface area of the aircraft triples the drag). Likewise, as the surface area of an aircraft decreases the drag experienced by the aircraft also decreases (e.g., halving the surface area of the aircraft reduces the drag by half). One approach to estimating/calculating drag relies, in part, on a frontal area of the aircraft and its exterior components. The frontal area is the area of an object (in this case the aircraft) when projected into a plane that is perpendicular to the flow of the aircraft.

Because the rotor 109 and the blades 110*a* and 110*b* extend from the boom 106*a*, they will produce drag while the VTOL aircraft 100 is in forward motion regardless of the degree to which the axis 140 and the axis 142 are misaligned. However, drag caused by the rotor 109 and the blades 110*a* and 110*b* varies with the degree of misalignment between the axis 140 and the axis 142 due, at least in part, to the frontal area of the blades changing based on the degree of misalignment. As a result, the drag can vary anywhere from being at maximum drag, when the axis 140 is perpendicular to the axis 142 (e.g., due to the frontal area of the blades being at its maximum), to being at minimum drag, when the axis 140 is parallel to the axis 142 (e.g., due to the frontal area of the blades being at its minimum). However, because the blades 110*a* and 110*b* can come to rest at an arbitrary rotational position, they can add significant drag to the aircraft 100 (e.g., if they come to rest where the axis 140 is not parallel to the axis 142).

It should be appreciated that aircraft 100 of FIGS. 1A, 1B, 1C, and 1D are merely illustrative of a variety of aircraft that can be used to implement embodiments of the present disclosure. Other aircraft implementations can include, for example, rotorcraft, tiltrotor aircraft, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

An aircraft (e.g., VTOL aircraft 100 (FIGS. 1A-1D), VTOL aircraft 700 (FIGS. 7A-7F), aircraft 800 (FIG. 8), VTOL UAV 900 (FIG. 9)) is subject to various aerodynamic or operational forces during operation, including, e.g., lift, drag, and thrust. In certain circumstances, the aerodynamic forces may increase the structural load on components of the aircraft. In general, the aerodynamic forces may be caused by airflow around the aircraft and components of the aircraft while the aircraft is in motion. For example, any components that protrude from the fuselage, booms, wings, or other aerodynamic surfaces of the aircraft can disrupt the airflow and increase drag on the aircraft during flight. Moreover, when an aircraft has both vertical flight and horizontal flight (forward and/or backward) capabilities, the components used for one flight mode can cause drag while the aircraft is operating in the other mode. For example, while an aircraft is in vertical flight, any forward thrust rotors and blades can cause drag with respect to the vertical motion of the aircraft.

Likewise, while an aircraft is in forward flight, any horizontal thrust rotors and blades can cause drag with respect to the forward motion of the aircraft. During flight, drag may increase with the speed of the aircraft and, as a result, high levels of drag may occur when the aircraft is flying at its maximum speed. Many aircraft spend more time in forward flight than in vertical flight. Thus, many embodiments of the present disclosure discuss examples of reducing drag during forward flight of an aircraft. However, the embodiments are not limited to such use and are equally applicable to reducing drag during vertical flight of an aircraft.

Excessive drag forces during operation of an aircraft (e.g., from rotors and blades) are undesirable and potentially harmful to the aircraft as they can negatively impact the structural integrity, mechanical integrity, and performance of the aircraft. For example, drag forces can cause the components of an aircraft to bend and may reduce the structural integrity and fatigue life of the aircraft. Moreover, drag forces counteract the thrust needed for (forward and/or vertical) flight of the aircraft and reduce the maximum speed and/or fuel efficiency of the aircraft. Accordingly, there is a need to control or reduce the drag caused by the components of an aircraft during operation.

The embodiments described throughout this disclosure provide numerous technical advantages, including using cams (and surfaces of the cams) to control rotors and blades and reduce drag forces caused by the rotors and blades during operation of an aircraft, which may improve safety, reliability (e.g., reliability of motors, rotors, blades, and mechanical equipment), and efficiency (e.g., increase the maximum speed and/or increase the fuel efficiency) of the aircraft. The described embodiments are also lightweight and flexible (e.g., they can be adjusted to align the blades with any desired axis of rotation). Moreover, the embodiments use a passive approach to controlling the rotors and blades to reduce drag and, therefore, do not increase the demand on power systems of the aircraft. As an example, the embodiments of the present disclosure utilize, among other things, a cam surface (including one or more recessions) to align blades in an aerodynamic position with respect to forward flight of an aircraft. Advantageously, when the motor is deactivated, the blades no longer come to rest at an arbitrary rotational position. Instead, the rotational position of the blades can be easily prescribed based on the alignment of recessions in the cam. The blades nest in the recessions in the cam to prevent rotation of the blades and to align the blades, e.g., with an axis of forward flight of the aircraft and reduce any parasitic drag caused by the blades.

Example embodiments for mitigating drag forces caused by rotors and blades of an aircraft and/or aligning blades with a prescribed axis of the aircraft are described below with more particular reference to the remaining FIGURES.

Figure 2A:
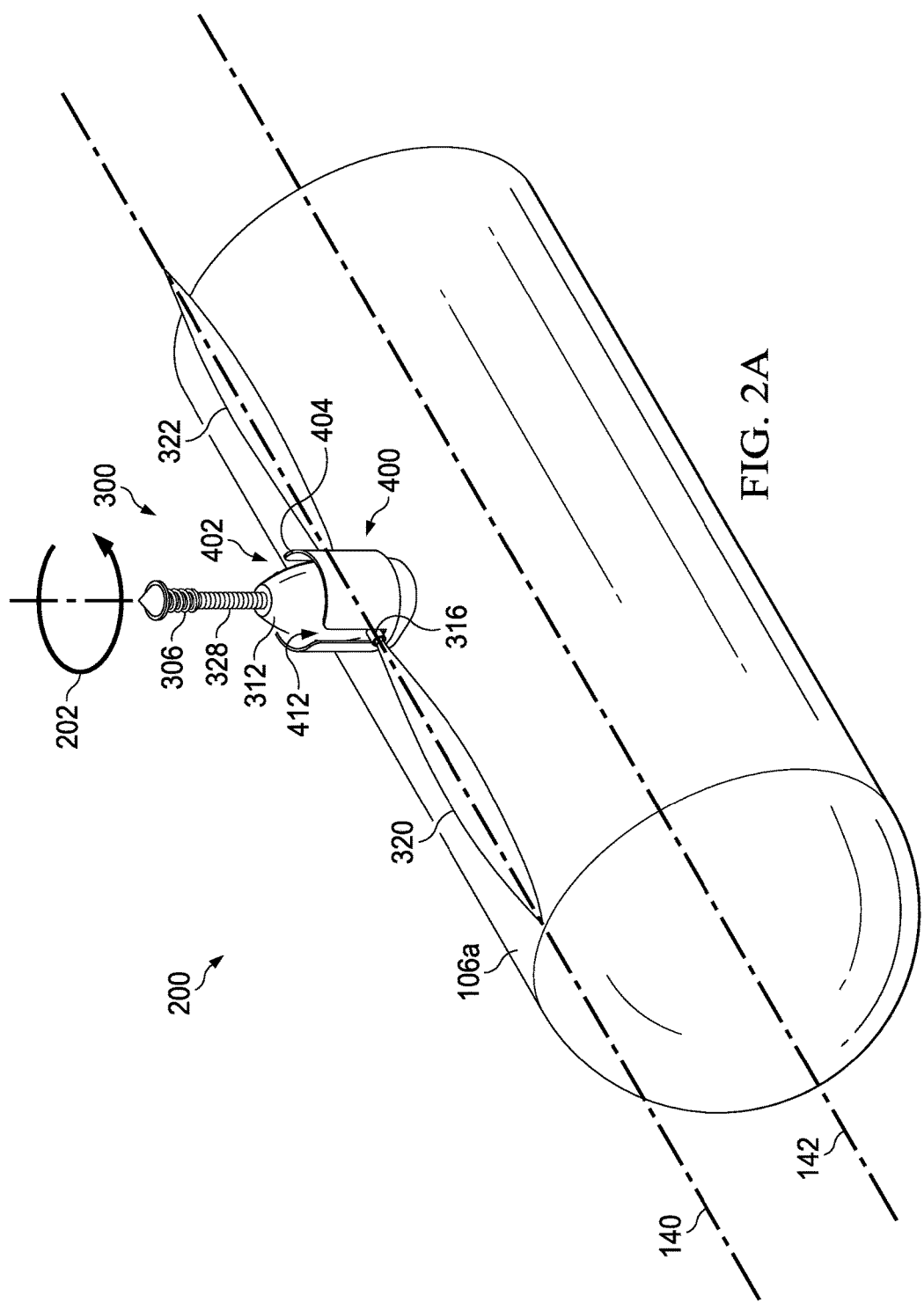

FIGS. 2A and 2B illustrate an isometric view of a portion of the aircraft 100 including a retractable and deployable flight rotor system 300 according to the present specification. The flight rotor system 300 is coupled to the forward boom 106a of the VTOL aircraft 100 (of FIGS. 1A, 1B, 1C, and 1D). FIG. 2A illustrates the flight rotor system 300 in a retracted configuration. FIG. 2B illustrates the flight rotor system 300 in a deployed configuration.

Turning to FIG. 2A, FIG. 2A illustrates a view of the forward boom 106a that is similar to FIG. 1D. A motor, which drives a rotor 312 and blades 320 and 322, is deactivated and the rotor 312 and the blades 320 and 322 are not in use (e.g., while the aircraft is in forward flight). A difference between FIG. 1D and FIG. 2A, is that the flight rotor system of FIG. 1D is replaced by the flight rotor system 300 in FIG. 2A. Another difference between FIG. 1D and FIG. 2A, is that, in FIG. 1D, the blades 110a and 110b are not aligned with the axis of forward flight of the VTOL aircraft 100 and, in FIG. 2A, the blades 320 and 322 are aligned with the axis of forward flight of the VTOL aircraft 100. In particular, in FIG. 2A, the axis 140 of the blades 320 and 322 at rest and the axis of forward flight 142 of the VTOL aircraft 100 are parallel to one another based on being held in position, at least in part, by a cam 400. Advantageously, the cam 400 aligning the blades 320 and 322 with the axis of forward flight of the VTOL aircraft 100 reduces drag caused by the blades during flight. The drag created by the blades at rest no longer varies between maximum drag and minimum drag (as is the case for the example of FIGS. 1A-1D). Instead, the blades 320 and 322 always come to rest at a rotational position where the axis 140 is parallel to the axis 142 and the drag is at its minimum, as illustrated in FIG. 2A.

The flight rotor system 300 comprises the rotor 312, the blades 320 and 322, a shaft 328, a stopper 306, and the cam 400. The shaft 328 includes a spiral spline along its length. The rotor includes a hole with a spiral groove that interlocks with the spiral spline on the shaft 328. The stopper 306 is a spring and, in FIG. 2A, the spring 306 is uncompressed. A motor (not shown) is applying torque to the shaft 328 causing the shaft 328 to rotate in a rotational direction 202 (i.e., counterclockwise when viewed from above the centerline of the shaft 328). Any relative rotation between the spiral spline (on the shaft 328) and the spiral groove (in the rotor 312) causes the rotor 312 to move axially (e.g., up or down) along the shaft 328. A cam surface 404 of the cam 400, at least in part, guides linear movement of the rotor 312 and the blades 320 and 322. In particular, recessions 402 and 412 in the cam surface 404 restrict movement of the blades 322 and 320 respectively and, thereby, restrict rotation of the rotor 312. A base (i.e., a root) of the blade 320 is nested in the recession 412 and a base of the blade 322 is nested in the recession 402. Such nesting of the blades in the recessions prevents the rotor 312 from rotating about the shaft 328 and allows movement (up or down) of the rotor 312 along the shaft 328.

As the shaft 328 rotates in the rotational direction 202, the interlocking spiral spline (on the shaft 328) and the spiral groove (in the rotor 312) drive the rotor 312 and the blades 320 and 322 up the shaft 328. The rotor 312 is unable to rotate while the blades 320 and 322 are engaged by the recessions in the cam 400. Thus, the interlocking spiral spline and spiral groove convert torque applied to the shaft 328 to linear force, which withdraws the rotor 312 from the cam 400 and withdraws the blades 320 and 322 from the recessions in the cam 400. The rotor 312 and the blades 320 and 322 continue to move along the shaft 328 in an upward direction beyond the walls of the cam 400. Eventually, the rotor 312 reaches a point at which it compresses the spring 306; the spring 306 exerts a force that opposes the upward movement of the rotor 312 based on being compressed.

Turning to FIG. 2B, the rotor 312 and the blades 320 and 322 are fully deployed from the cam 400. The upward movement (i.e., of the rotor 312 and the blades 320 and 322 along the shaft 328) stops when there is no relative rotation between the spiral spline (on the shaft 328) and the spiral groove (in the rotor 312). In the configuration illustrated in FIG. 2B, the upward movement of the rotor 312 and the blades 320 and 322 is stopped, at least in part, by the spring 306. When the upward movement is stopped, the interlocking spiral spline and spiral groove no longer convert torque applied (by the motor) to the shaft 328 to linear force.

Instead, the torque is transferred to the rotor 312 and the blades 320 and 322 causing them to rotate at the same rate as the shaft 328. 204a and 204b generally indicate the rotational direction of the blades 320 and 322. As the blades 320 and 322 rotate (e.g., as indicated by 204a and 204b), they generate thrust to initiate and/or maintain vertical flight of the VTOL aircraft 100. Advantageously, when the blades 320 and 322 are deactivated, they no longer come to rest at an arbitrary rotational position (as is the case for the example of FIGS. 1A-1D). Instead, the blades 320 and 322 retract into the recessions 402 and 412 in the cam 400. The resting rotational position of the blades 320 and 320 be easily prescribed based on the alignment of the recession 402 and 412 in the cam 400.

In a particular embodiment, flight rotor systems identical to (or similar to) the flight rotor system 300 can replace the rotor systems on each of the booms 106a, 106b, 108a, and 108b on the VTOL aircraft 100. In such an embodiment, the flight rotor systems of the present disclosure reduce drag at each of the vertical thrust rotors, which can increase the maximum speed and/or the fuel efficiency the VTOL aircraft 100. The flight rotor system 300 is described in more detailed with reference to FIGS. 3A-3F. The cam 400 is described in more detailed with reference to FIGS. 4A-4B.

FIGS. 3A, 3B, 3C, 3D, 3E, and 3F illustrate details of the retractable and deployable flight rotor system 300.

Figure 3A:
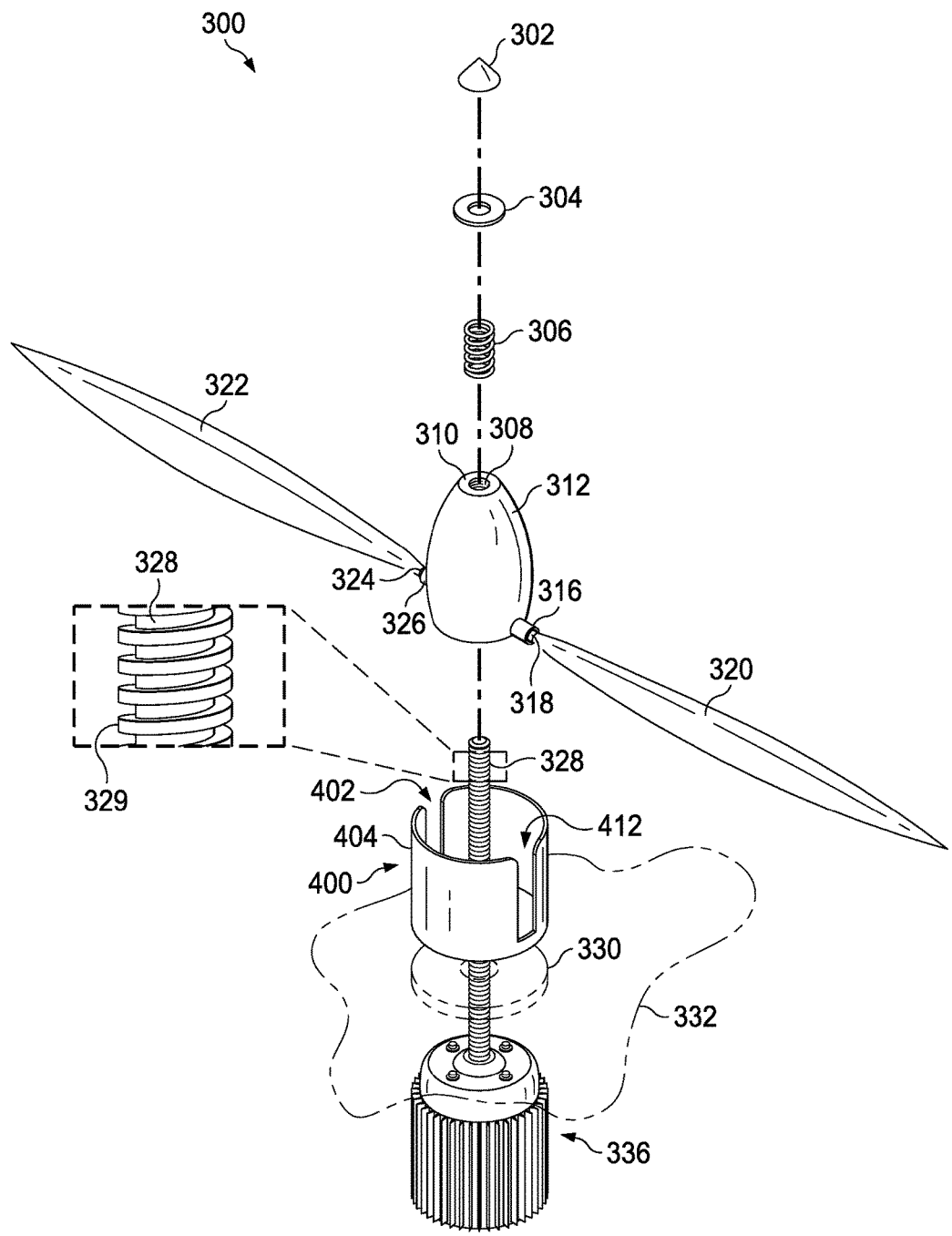
FIGS. 3A, 3B, 3C, 3D, 3E, and 3F illustrate details of a retractable and deployable flight rotor system according to the present specification.

Turning to FIG. 3A, FIG. 3A is an exploded diagram of the flight rotor system 300. The flight rotor system 300 comprises a head 302, a washer 304, a stopper 306, a rotor 312, blades 320 and 322, a shaft 328, a spiral spline 329, a cam 400, a damper 330, a surface 332, and a motor 336.

The shaft 328 comprises a spiral spline 329, which drives axial movement and rotation of the rotor 312. A first end of the shaft 328 is engaged by the motor 336. A second end of the shaft 328 cantilevers from the motor 336. The head 302 is located at the second end of the shaft 328. The motor 336 is configured to apply torque at the first end to rotate the shaft 328. The spiral spline 329 extends along at least a portion of a length of the shaft between the first end and the second end. The spiral spline 329 behaves like threads on a screw to drive movement of the rotor 312. The spiral spline 329 inclines downward as is spirals clockwise about the shaft 328 (when viewed from above the centerline of the shaft 328).

As the rotor 312 rotates around a central point, the blades 320 and 322 also rotate about the central point and generate thrust (e.g., to propel an aircraft into flight). The blades 320 and 322 are attached to the rotor 312 at a root of each blade, i.e., roots 318 and 324, respectively. A cam follower wraps the root of each blade and is configured to follow a profile of the cam surface 404 as the rotor 312 rotates about the shaft 328. Cam follower 316 wraps the root 318. Cam follower 326 wraps the root 324. The rotor 312 comprises a bearing surface 310 and a hole 308. The bearing surface 310 is a flat surface for supporting the stopper 306 (which, in this case, is a spring). The hole 308 is tubular in shape and extends through the entire height of the rotor 312. The hole 308 comprises a spiral groove 309 (not labeled on FIG. 3A; labeled in FIG. 3E) configured to mate with the spiral spline 329 on the shaft 328. The spiral groove 309 inclines downward as is spirals clockwise about the hole 308 (when viewed from above the centerline of the shaft 308). The spiral groove 309 and the spiral spline 329 can interlock with one another because the size and shape of the grooved hole 308 corresponds to the size and shape of the splined shaft 328. The hole 308, at least in part, guides relative rotation between the shaft 328 and the rotor 312 and guides the vertical movement of the rotor 312 up and/or down the length of the shaft 328. Any relative rotation between the spiral spline 329 on the shaft 328 and the spiral groove 309 in the hole 308 causes the rotor 312 to linearly move along the shaft 328 (i.e., axially up or down the shaft) as is described further with respect to FIGS. 3B-3F.

The head 302, the washer 304, and the spring 306 are located above the rotor 312 and each contributes to stopping the linear movement of the rotor 312 along the shaft 328 and stopping the relative rotation between the spiral spline 329 and the spiral groove 309.

The cam 400 is configured to guide both vertical and horizontal movement of the rotor 312 and the blades 320 and 322. The cam 400 comprises a cam surface 404. The cam surface 404 includes recessions 402 and 412. Horizontal portions of the cam surface 404 (e.g., a rim at the top of the cam 400 and rims at the bottom of the recessions 402 and 412) constrain the vertical movement of the rotor 312 and the blades 320 and 322. Vertical portions of the cam surface 404 (e.g., rims on both sides of each of the recessions 402 and 412) constrain the rotation of the rotor 312 and the blades 320 and 322. The root of each blade nests in one of the recessions, which constrains rotation of the rotor 312 about the shaft 328 and allows linear movement of the rotor 312 along the shaft 328. The cam 400 is attached to the surface 332 of the aircraft by an attachment mechanism (e.g., a mechanical fastener, bolts, welding, and the like) to maintain a fixed (stationary) position on the surface 332. The blades 320 and 322 can forcefully strike the cam 400 from above (e.g., due to moving at a high velocity while traversing down the shaft 328). Thus, some embodiments employ the damper 330 to damp impact loads and/or displacement imposed on the cam 400.

FIGS. 3B, 3C, 3D, 3E, and 3F illustrate an exemplary operation of the flight rotor system 300.

Figure 3B:
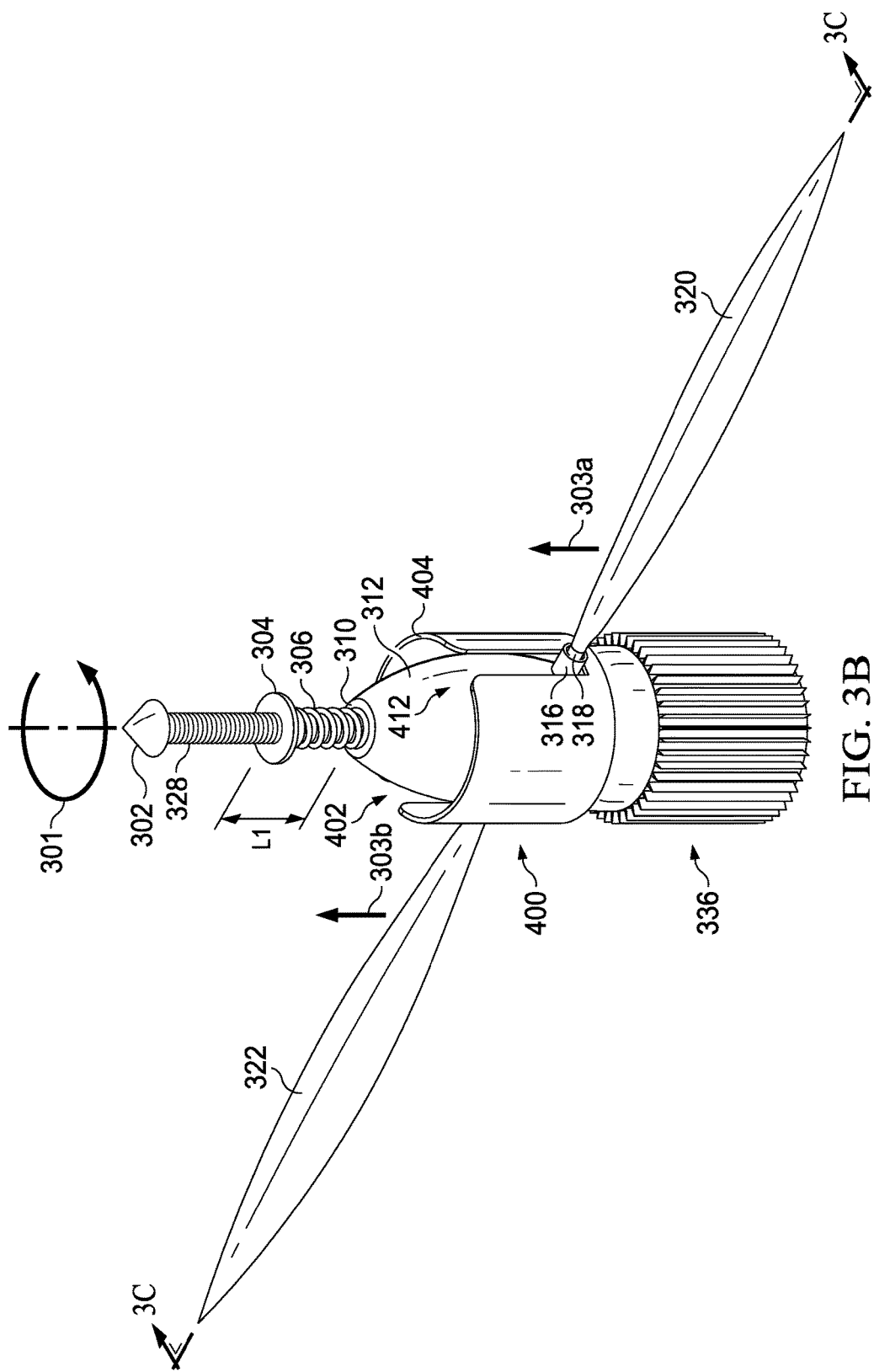
Figure 3C:
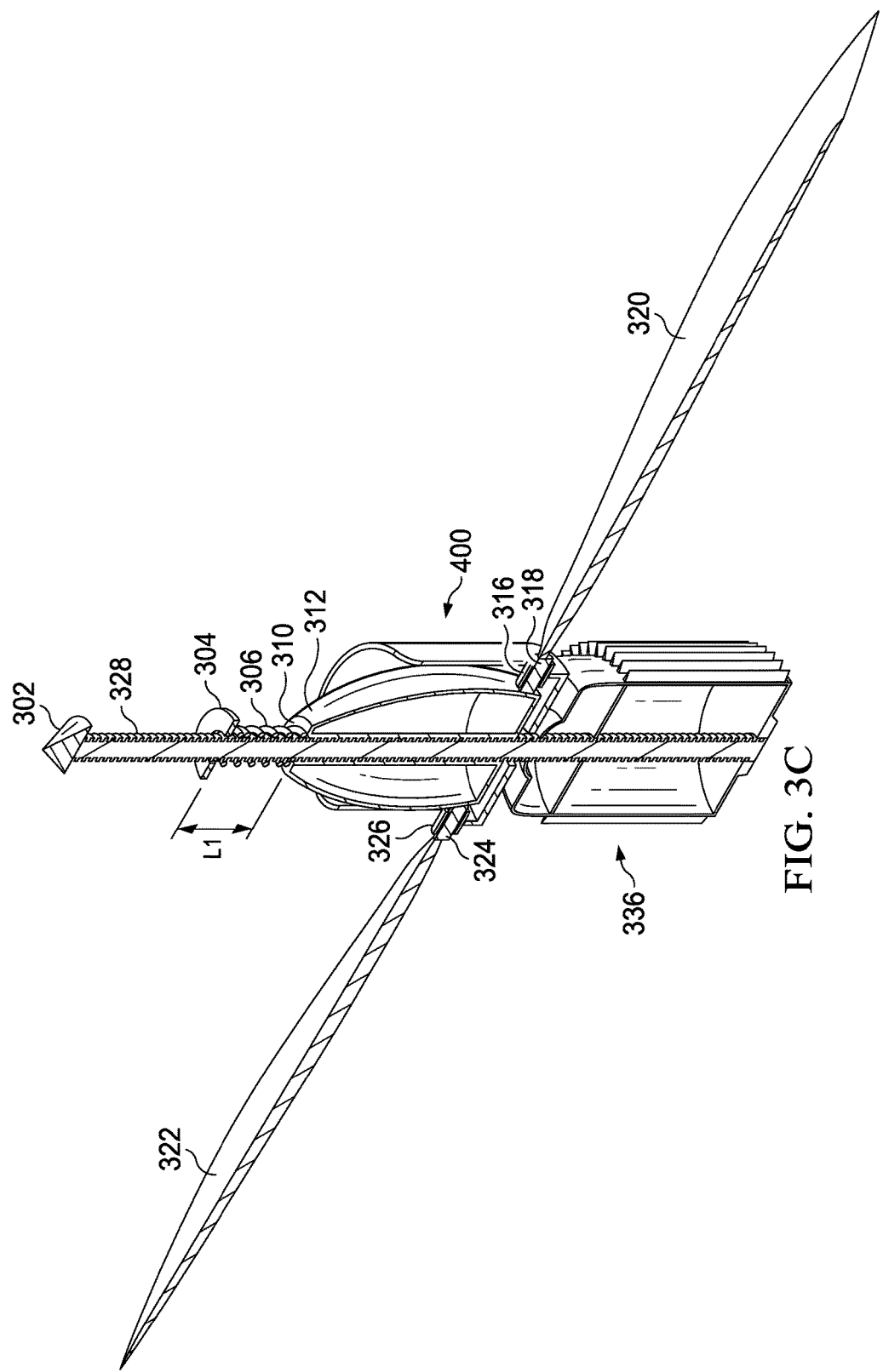

Turning to FIGS. 3B and 3C, FIG. 3B is a detailed view of the flight rotor system 300 in a retracted position; FIG. 3C is a cut-away view of the flight rotor system 300 as depicted in FIG. 3B (as generally indicated by the section lines labeled "3C" in FIG. 3B). In the retracted position, the rotor 312 is seated (e.g., stowed) within a cavity defined by walls of the cam 400 and the blades 320 and 322 (i.e., the roots 318 and 324) nest in the recessions 402 and 412 of the cam 400. The recessions 402 and 412 in the cam 400 can be oriented to align the blades 320 and 322 with a prescribed axis (e.g., the axis of flight of an aircraft, an axis of a wing, an axis of a wing, and the like) to reduce drag caused by the blades during flight. These recessions restrict rotation of the blades 320 and 322 and the rotor 312. Thus, torque applied to the shaft 328 causes relative rotation between the rotor 312 and the shaft 328 though the rotor 312 is not free to rotate. Relative rotation between the spiral spline 329 (on the shaft 328) and the spiral groove 309 (in the hole 308) causes the rotor 312 to move along the shaft 328 (i.e., axially up or down the shaft). The spiral spline 329 and the spiral groove 309 convert the torque applied to the shaft 328 to linear force, which moves the rotor 312 along the shaft 328.

In this example, the rotor 312 does not rotate while the shaft 328 is rotated (by the motor 336) in a rotational direction 301, which causes the rotor 312 and the blades 320 and 322 to move along the shaft in an axial direction as indicated by arrows 303a and 303b (i.e., withdraws the rotor 312 and the blades 320 and 322 from the cam 400 toward the deployed position). In this example, the rotational direction 301 is counterclockwise when viewed from above the centerline of the shaft 328. Such rotation causes relative rotation between the rotor 312 and the shaft 328 in a first rotational direction, i.e., where the rotor 312 is stationary and the shaft 328 rotates counterclockwise inside the rotor (equivalent to the rotor 312 rotating clockwise around the shaft 328 while the shaft 328 is stationary). As the rotor 312 and the blades 320 and 322 move up the shaft 328 in the direction 303 (i.e., 303a and 303b), the rotor 312 withdraws from the cam 400 and the blades 320 and 322 withdraw from the recessions 402 and 412. The spring 306 is located between the rotor 312 and the second (cantilevered) end of the shaft 328. The spring 306 rests on the bearing surface 310 of the rotor 312 and is uncompressed by the rotor 312. The uncompressed length of the spring is labeled length "L1" in FIGS. 3B and 3C. The washer 304 rests on the spring 306. Both the spring 306 and the washer 304 are free to move along the length of the shaft 328. Thus, the spring 306 and the washer 304 advance up the shaft along with the rotor 312 and the blades 320 and 322.

The rotor 312, the blades 320 and 322, the spring 306, and the washer 304 can continue to advance up the shaft 328 (based on the relative rotation between the rotor 312 and the shaft 328) until a point of contact between the washer 304 and the head 302. Further advancement of the rotor 312 in the axial direction 303 beyond the point of contact compresses the spring 306. When compressed, the spring 306 exerts a force on the rotor 312 that opposes the upward motion of the rotor 312 (i.e., the spring exerts a downward force on the rotor 312). The rotor 312 stops advancing in the axial direction 303 based, at least in part, on the spring 306 being compressed. In some examples, the spring 306 being fully compressed stops the rotor 312 (e.g., because the spring cannot be compressed any further). In other examples, the spring 306 being partially compressed stops the rotor (e.g., when the downward force exerted by the spring 306 is equal to any upward forces acting on the rotor 312). Stopping linear movement of the rotor 312 along the shaft 328 also stops the relative rotation between the spiral spline 329 (on the shaft 328) and the spiral groove 309 (in the hole 308). Stopping the relative rotation between the spiral spline 329 and the spiral groove 309 while the shaft 328 is being rotated causes the rotor 312 and the shaft 328 to synchronously rotate (e.g., the rotor 312 and the shaft 328 rotate at the same rotational velocity).

Figure 3D:
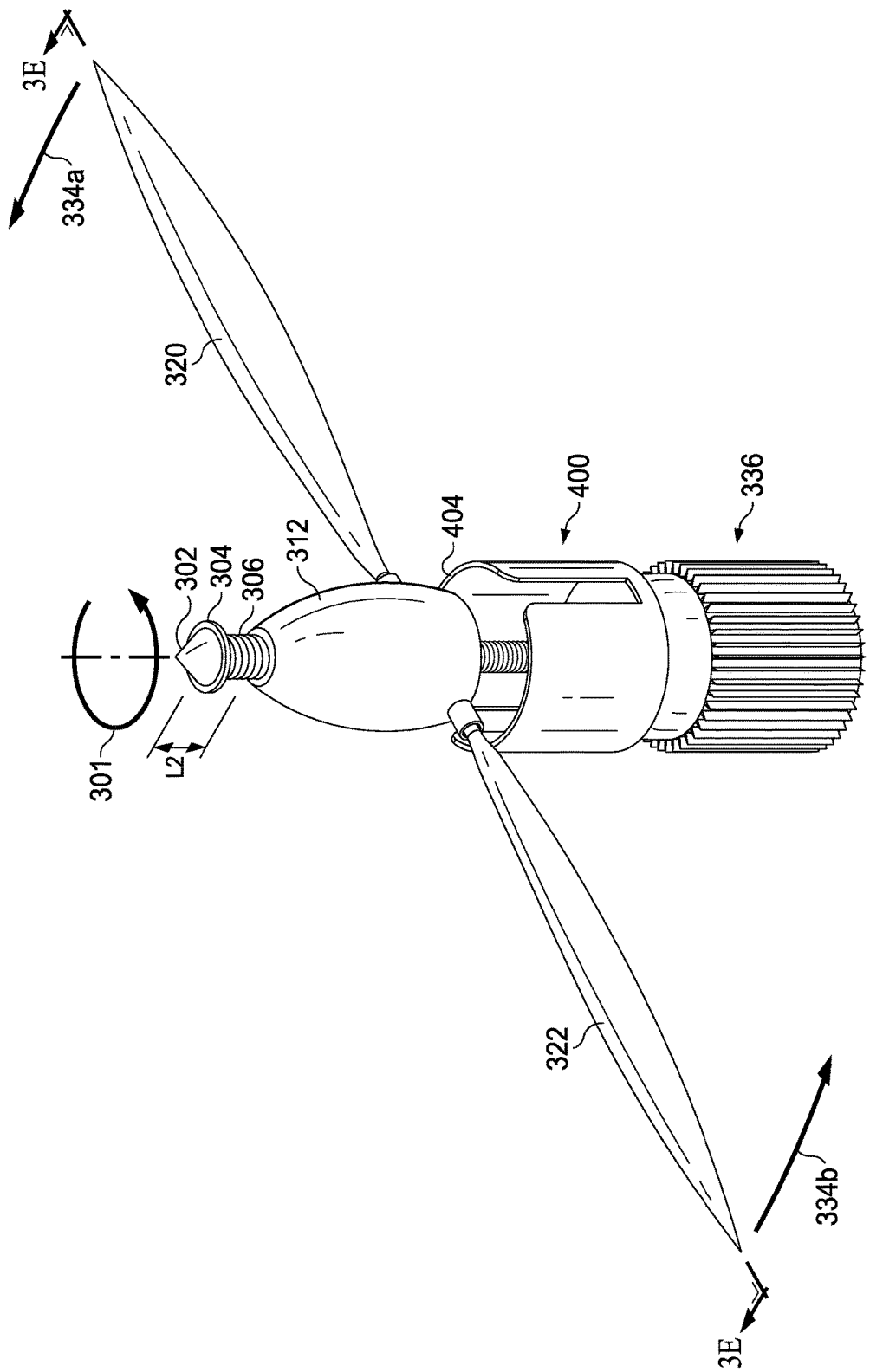
Figure 3E:
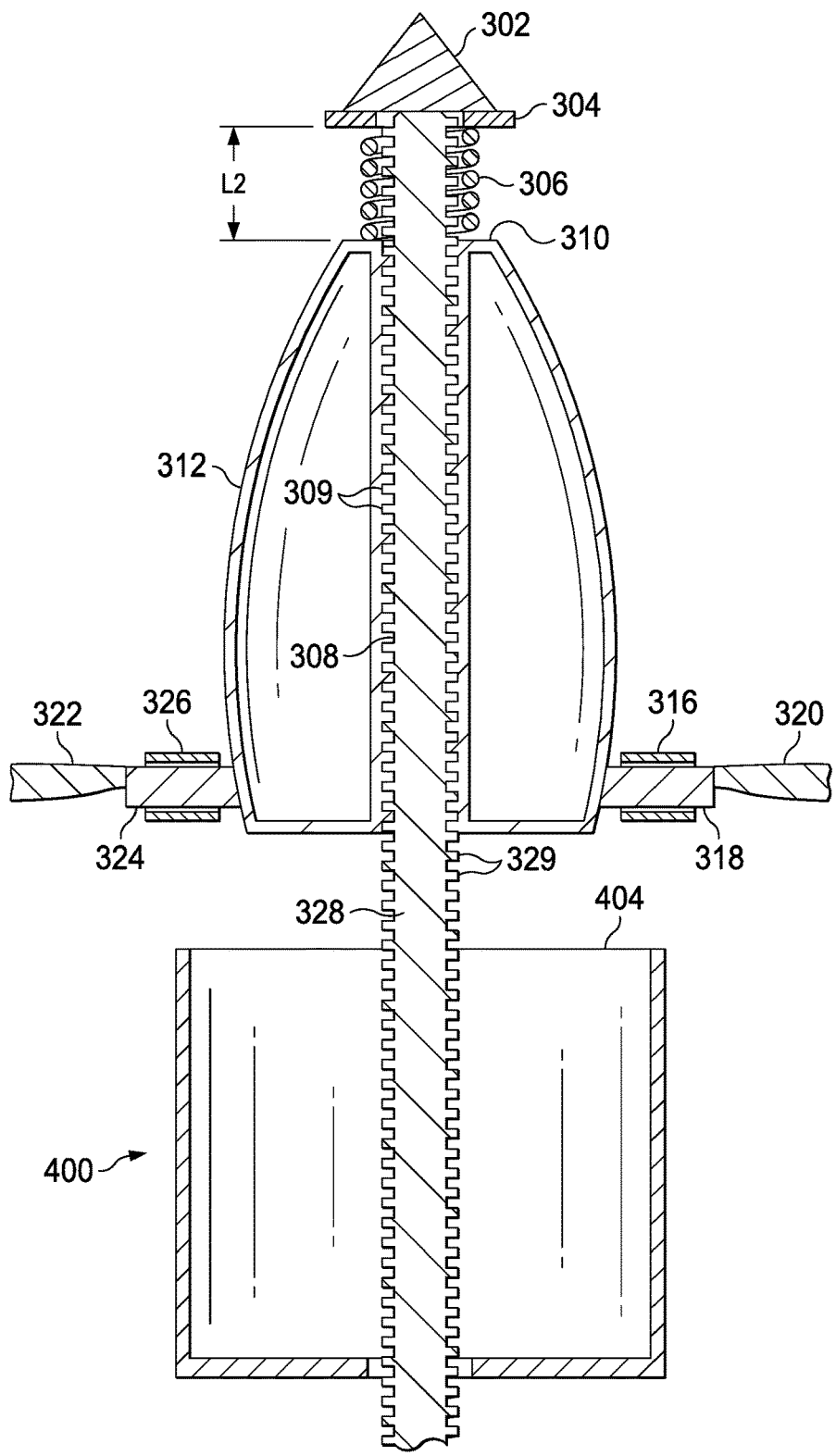

Turning to FIGS. 3D and 3E, FIG. 3D is a detailed view of the flight rotor system 300 in a deployed position; FIG. 3E is a cut-away view of the flight rotor system 300 as depicted in FIG. 3D (as generally indicated by the section lines labeled "3E" in FIG. 3D).

In the deployed position, the rotor 312 and the shaft 328 synchronously rotate and the spring 306 is compressed, in part, by the rotor 312. The motor 336 rotates the shaft 328 in rotational direction 301, which causes the rotor 312 and the blades 320 and 322 to rotate in the same rotational direction (as generally indicated by arrows 334a and 334b tracing a partial rotation of the blades 320 and 322, respectively). The rotation of the blades 320 and 322 is counterclockwise when viewed from above the centerline of the shaft 328. The shaft 328 and the rotor 312 rotate at approximately the same rotational velocity and, as a result, there is no relative rotation between them. As the blades 320 and 322 rotate, they generate thrust to initiate and/or maintain flight of an aircraft.

The motor 336 is actively applying torque to the shaft 328 but the rotor 312 is stationary at a location along the length of the shaft 328 based, at least in part, on the spring 306 being compressed. The spring 306 is compressed, in part, by the rotor 312. The compressed length of the spring is labeled length, "L2" in FIGS. 3D and 3E. The compressed length L2 (shown in FIGS. 3D and 3E) is less than the uncompressed length L1 (shown in FIGS. 3B and 3C). The spring 306 exerts a downward force on the rotor 312 based on the spring being compressed to the length L2 (e.g., with a force that is proportional to an amount of compression, L1-L2). The downward force exerted by the spring 306 counteracts upward forces acting on the rotor 312 and the rotor 312 is not advancing axially along the length of the shaft 328.

When the motor 336 is deactivated and stops applying torque to the shaft 328, the shaft 328 may (abruptly) stop rotating while the blades 320 and 322 and rotor 312 continue to rotate about the shaft 328 (e.g., due to inertia of the rotor 312 and the blades 328). Such inertial rotation causes relative rotation between the rotor 312 and the shaft 328 in a second rotational direction, i.e., where the rotor 312 rotates counterclockwise about the shaft 328 and the shaft 328 is stationary inside the rotor 312 (which is equivalent to the rotor 312 being stationary and the shaft 328 rotates clockwise inside the rotor 312). The rotor 312 transitions from the deployed position to the retracted position by moving axially down the shaft 328 based on (1) the relative rotation between the rotor 312 and the shaft 328 being in the second rotational direction and/or (2) the (compressed) spring 306 exerting a downward force on the rotor 312 (which can cause relative rotation between in the second rotational direction).

Figure 3F:
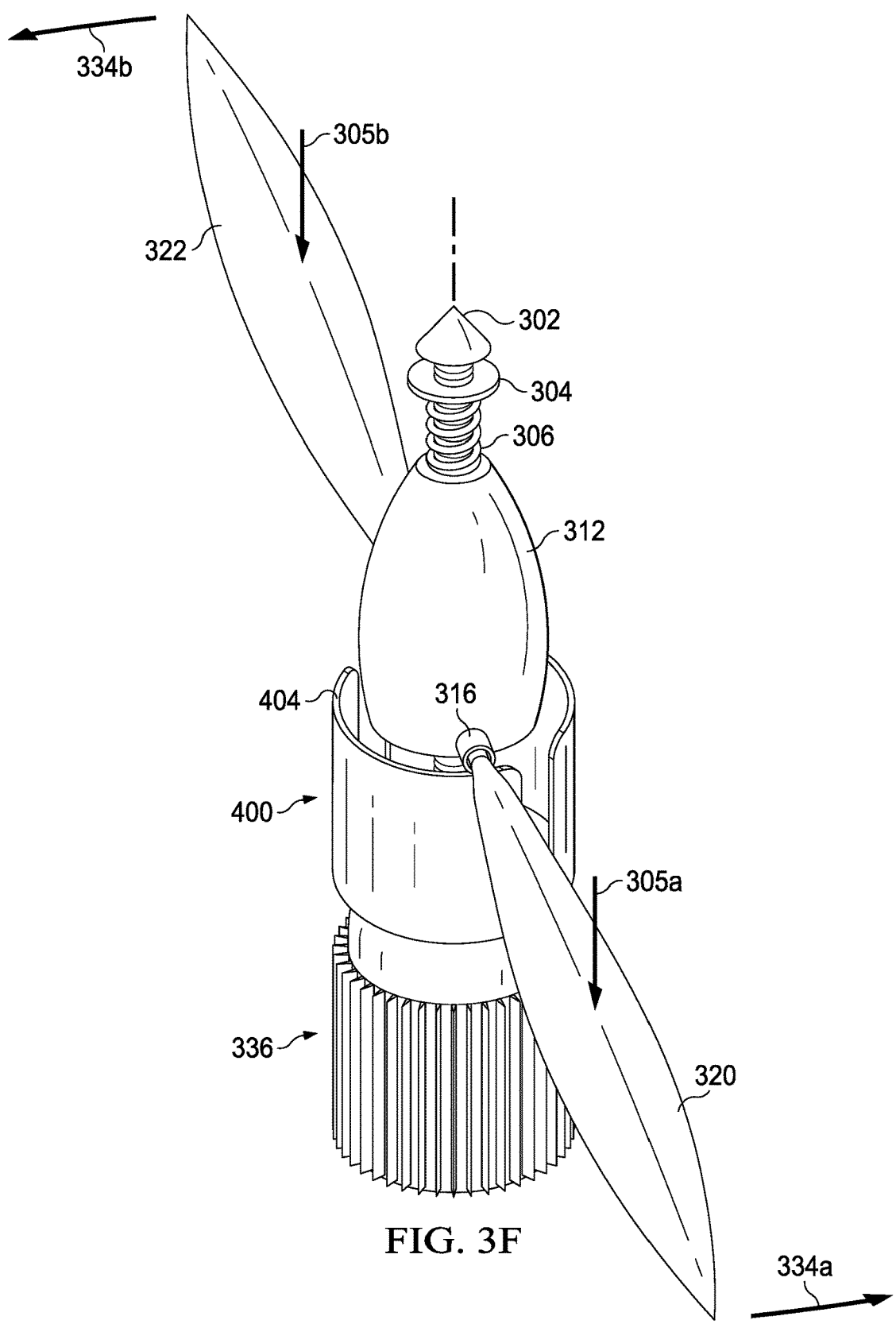

Turning to FIG. 3F, FIG. 3F is a detailed view of the flight rotor system 300 as it transitions from the deployed position to the retracted position. The motor 336 is deactivated and is not applying torque to the shaft 328. During the transition, the rotor 312 moves down the shaft 328 (i.e., in an axial direction as generally indicated by arrows 305a and 305b). The rotor 312 moves down the shaft 328 based, in part, on the relative rotation between the rotor 312 and the shaft 328 being in a second rotational direction second rotational direction. In this example, the rotor 312 rotates counterclockwise about the shaft 328 (when view from above the shaft) and the shaft 328 is stationary inside the rotor 312 (i.e., in a rotational direction as generally indicated by arrows 334a and 334b). In FIG. 3F, the rotor 312 and blades 320 and 322 moved down the shaft 328 to a point where the cam followers 316 and 326 (at the root of each blade) contact the cam surface 404. The initial contact may cause an impact load on the cam 400. A damper (e.g., damper 330) can damp vibrations caused by such an impact experienced by the cam 400. While the cam followers 316 and 326 are in contact with the cam surface 404, the rotor 312 and blades 320 and 322 continue rotating due to inertia. The cam followers 316 and 326 follow the cam surface 404 as the rotor 312 rotates about the shaft 328. In particular, the cam followers 316 and 326 follow a topmost portion of the cam surface 404 until they reach the recessions 402 and 412 (by rolling about the root of each blade to follow the cam surface 404). The cam followers 316 and 326 guide the root of each blade into one of the recessions 402 and 412 (e.g., where each cam follower contacts a bottommost portion of the recession when nested). The cam surface 404 is rounded at the transition between the topmost portion and the recessions to help the blades 320 and 322 drop into the recessions. While the blades 320 and 322 are in the recessions 402 and 412, the rotor 312 is substantially prevented from rotating about the shaft 328, however, the rotor 312 is free to move vertically along the shaft 328. A weight of the rotor 312 can cause the rotor to continue to move down the shaft 328 while the rotor 312 is prevented from rotating about the shaft 328. Because the motor 336 does not provide substantial resistance to the shaft rotating, the rotor 312 moving down the shaft 328 (while being prevented from rotating) can cause the shaft 328 to rotate clockwise inside the rotor 312 (i.e., relative rotation in the second rotational direction). The rotor 312 and blades 320 and 320 continue moving down the shaft 328 until they reach the retracted position (e.g., as illustrated in FIGS. 3A and 3B).

In general, relative rotation between the spiral spline 329 (on the shaft 328) and the spiral groove 309 (in the hole 308 of the rotor 312) causes the rotor 312 to linearly move along the shaft 328. Relative rotation in a first rotational direction (see, e.g., FIGS. 3B and 3C) about the shaft 328 causes the rotor 312 to move up the shaft (i.e., in a first axial direction as generally indicated by arrows 303a and 303b). Relative rotation in the first rotational direction drives withdrawal of the blades 320 and 322 from nesting in the recessions 402 and 412. In the first rotational direction, the rotor 312 may be stationary while the shaft 328 rotates counterclockwise inside the rotor 312 (which is equivalent to the rotor 312 rotating clockwise around the shaft 328 while the shaft 328 is stationary). Relative rotation in a second rotational direction (see, e.g., FIG. 3F) about the shaft 328 causes the rotor 312 to move down the shaft 328 (i.e., in a second axial direction as generally indicated by arrows 305a and 305b). Relative rotation in the second rotational direction drives nesting the blades 320 and 322 in the recessions 402 and 412. In the second rotational direction, the rotor 312 may rotate counterclockwise about the shaft 328 and the shaft 328 is stationary inside the rotor (which is equivalent to the rotor 312 being stationary and the shaft 328 rotating clockwise inside the rotor 312). The first rotational direction and the second rotational direction are opposite one another. In addition, the first axial direction and the second axial direction are opposite one another.

In the specification, reference is made to the relative rotation between various components as depicted in the attached drawings (e.g., between a rotor and a shaft and/or between a spiral spline 329 (on the shaft 328) and a spiral groove 309 (in on the rotor 312)). However, as will be recognized by those skilled in the art after a complete reading of the present disclosure, the devices, components, members, apparatuses, etc. described herein may be positioned in any desired orientation. Thus, the use of terms such as "clockwise," "counterclockwise," or other similar terms to describe a rotational relationship between various components should be understood to describe a relative relationship between the components as the components described herein may be oriented in any desired direction. In addition, the spiral spline 329 and the spiral groove 309 have a particular incline as they spiral about a component. The particular incline (e.g., whether clockwise or counterclockwise about the component), in part, determines the axial direction in which the rotor and blades move along the shaft based on the relative rotation. For example, in the embodiments described above, relative rotation in the first rotational direction causes the rotor 312 to move up the shaft 328 and relative rotation in the second rotational direction causes the rotor 312 to move down the shaft 328. However, if the particular incline of the spiral spline 329 (on the shaft 328) and the spiral groove 309 (on the rotor 312) were reversed, then relative rotation in the first rotational direction would cause the rotor 312 to move down the shaft 328 and relative rotation in the second rotational direction would cause the rotor 312 to move up the shaft 328.

The rotor 312 and blades 320 and 320 can be repeatedly deployed and/or retracted by activating and deactivating the motor 336. The mechanical characteristics of the rotor system enable the rotor 312 and the blades 320 and 320 to move up and down the shaft 328 using only the torque supplied by the motor 336, the weight of the rotor 312, and/or forces imposed by the spring 306. The motor 336 is the primary active component that requires energy input; the remaining features (e.g., weight of the rotor 312, the spring force from the spring 306) are passive and do not require additional energy input to the flight rotor system.

In the example of FIGS. 3A-3F, the spline (e.g., a raised structure) is located on the shaft 328 and the groove (e.g., a recessed structure) is located within the hole 308 of the rotor 312. However, these may be reversed without departing from the teachings of the present disclosure. In some examples, the spline is located within the hole 308 of the rotor 312 and the groove is located on the shaft 328.

Figure 4A:
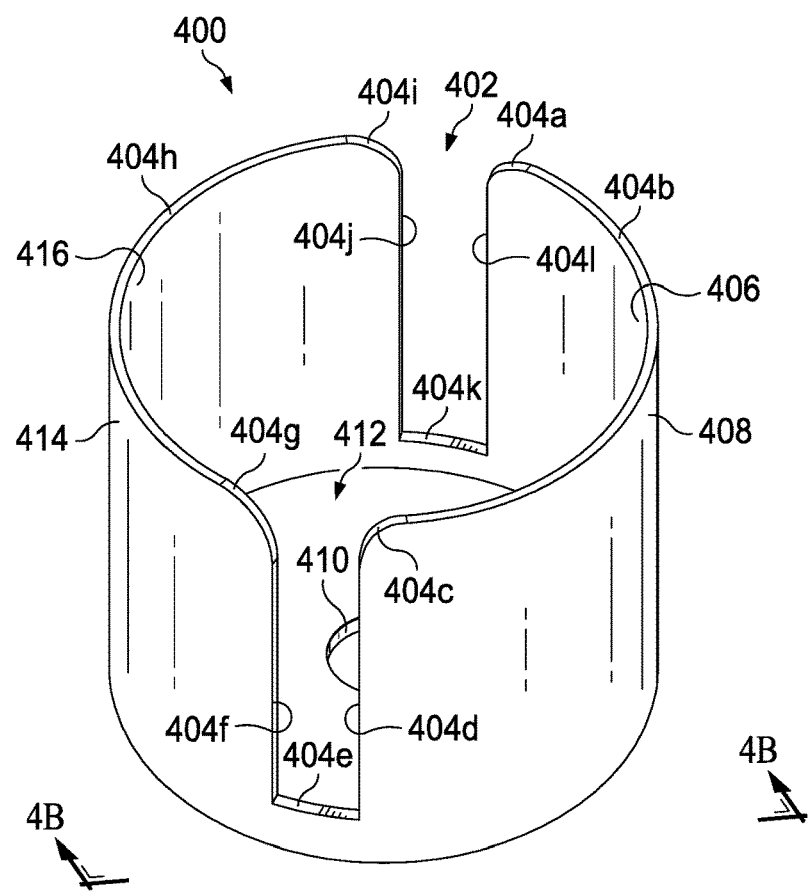
FIGS. 4A and 4B illustrate details of an apparatus comprising a cam surface.
Figure 4B:
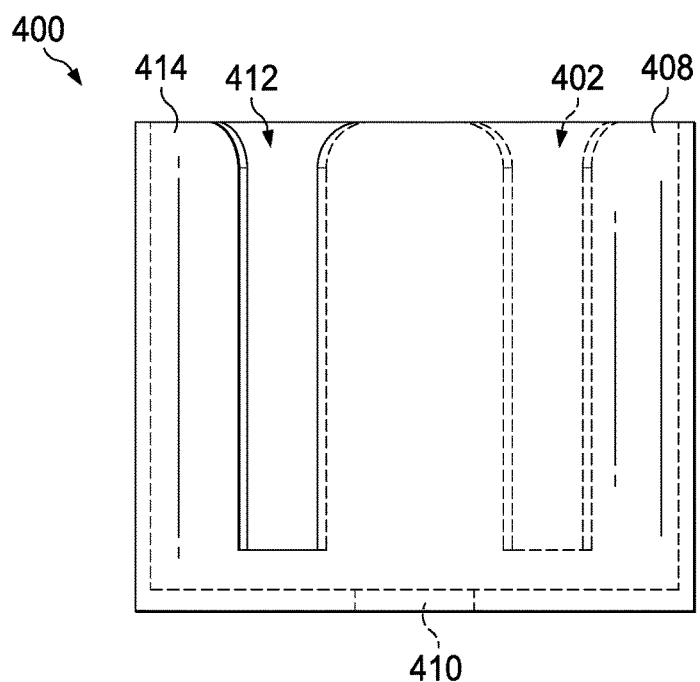

FIGS. 4A and 4B illustrate details of a cam 400. FIG. 4A is a three-dimensional isometric view of the cam 400. FIG. 4B is a side view of the cam 400 as depicted in FIG. 4A (as generally indicated by the view lines labeled "4B" in FIG. 4A). The cam 400 is generally cylindrical in shape and comprises a cam surface 404, an opening 410, and an arcuate wall. The cam surface 404 includes surface portions 404a, 404b, 404c, 404d, 404e, 404f, 404g, 404h, 404i, 404j, 404k, and 404l. The opening 410 is to allow a shaft (e.g., the shaft 328) to pass through the cam 400. The wall includes recessions 402 and 412, which substantially bifurcate the wall into a first wall portion and a second wall portion. The recessions 402 and 412 are depressions in the cam surface 404 and create notches in the wall through which blades (e.g., blades 320 and 322) can extend. The first wall portion includes an inner surface 416 and an outer surface 414. The second wall portion includes an inner surface 406 and an outer surface 408. The inner surfaces 406 and 416 of the wall, at least in part, create a cavity in which to receive a rotor (e.g., the rotor 312). The cam 400 may be constructed of metal (e.g., steel, aluminum, an alloy), a composite material (e.g., carbon fiber reinforced polymer), or any other rigid material.

The recessions 402 and 412 are configured to partially surround the blades to constrain rotation of the blades but allow vertical movement of the blades along the height of the recessions. In particular, horizontal portions of the cam surface 404 (e.g., 404b, 404e, 404h, and 404k) constrain the vertical movement of the rotor 312 and the blades 320 and 322. Vertical portions of the cam surface 404 (e.g., 404d, 404f, 404j, and 404l) constrain the rotation of the rotor 312 and the blades 320 and 322. The cam surface 404 is rounded at transitions between a topmost portion (e.g., 404b and 404h) and the recessions 402 and 412 to help the blades 320 and 322 drop into the recessions (i.e. at transitions 404a, 404c, 404g, and 404i).

The recessions 402 and 412 have an axis of alignment (e.g., a single line that passes through a center of both recessions) that may be oriented along a prescribed axis. For example, the axis of alignment may align with an axis of forward flight of an aircraft (e.g., to align the blades with the axis of forward flight based on the blades being nested in the recessions, see, e.g., FIG. 2A). As another example, the axis of alignment may align with a longitudinal axis of a wing and/or a fuselage (e.g., to align the blades with the longitudinal axis of the wing and/or the fuselage based on the blade being nested in the recession, see, e.g., FIGS. 8 and 9).

In the example of FIGS. 4A and 4B, the topmost portion of the cam surface 404 is substantially flat (i.e., lies in a same plane). However, other examples may utilize a variable, non-planar cam surface. For example, a cam 500 of FIGS. 5A and 5B comprises a non-planar cam surface.

Figure 5A:
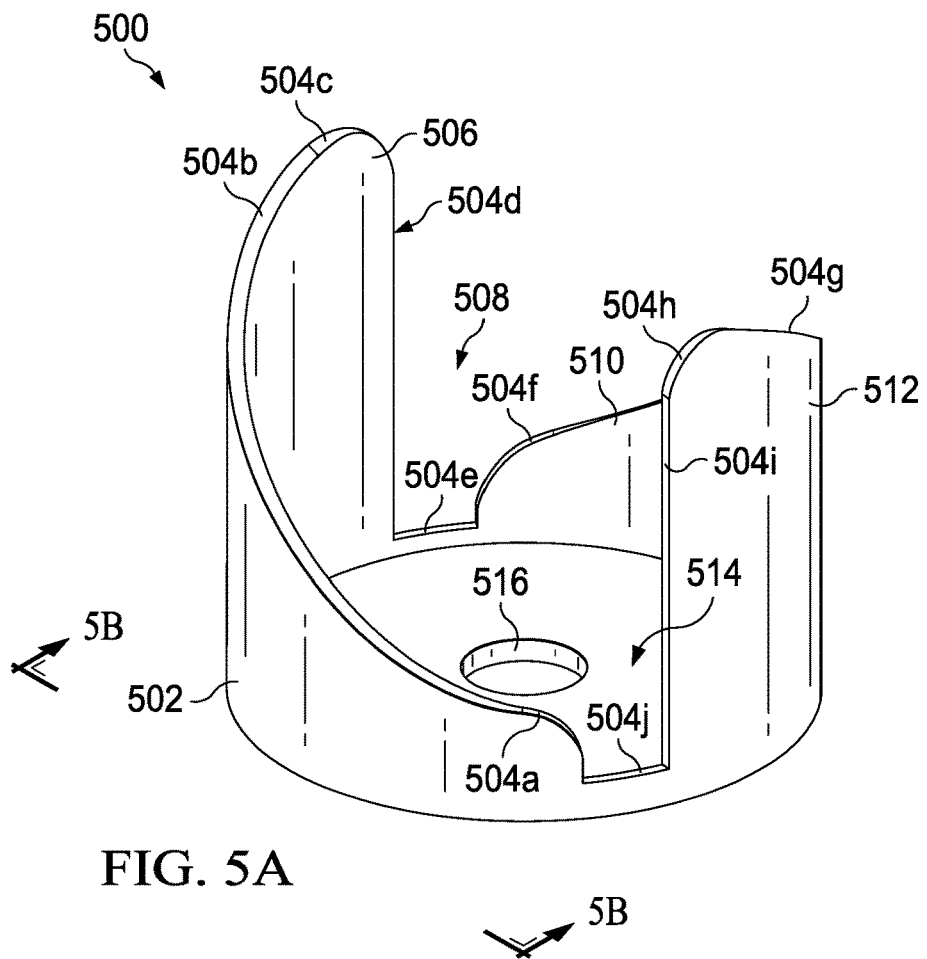
FIGS. 5A and 5B illustrate details of another apparatus comprising a cam surface.
Figure 5B:
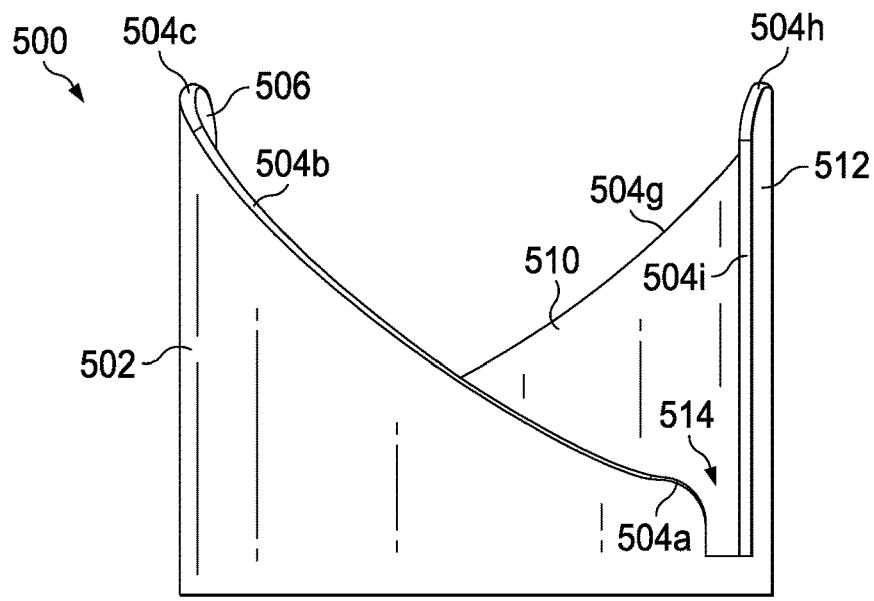

FIGS. 5A and 5B illustrate details of the cam 500 comprising a sloped cam surface 504. FIG. 5A is a three-dimensional isometric view of the cam 500. FIG. 5B is a side view of the cam 500 as depicted in FIG. 5A (as generally indicated by the view lines labeled "5B" in FIG. 5A). The cam 500 is generally cylindrical in shape and comprises a cam surface 504, an opening 516, and an arcuate wall. The cam surface 504 includes surface portions 504a, 504b, 504c, 504d, 504e, 504f, 504g, 504h, 504i, and 504j. The opening 516 is to allow a shaft (e.g., the 328) to pass through the cam 500. The wall includes recessions 508 and 514, which substantially bifurcate the wall into a first sloped wall portion and a second sloped wall portion. The recessions 508 and 514 are depressions in the profile of the cam 500 and create notches in the wall through which blades (e.g., blades 320 and 322) can extend. The first sloped wall portion includes an inner surface 506 and an outer surface 502. The second sloped wall portion includes an inner surface 510 and an outer surface 512. The inner surfaces 506 and 510 of the wall, at least in part, create a cavity in which to receive a rotor (e.g., rotor 312). Each wall portion slopes from one vertical side to the other vertical side. For example, the first sloped wall portion slopes from the vertical side 504d toward the shorter rounded portion 504a. Likewise, the second sloped wall portion slopes from the vertical side 504i toward the shorter rounded portion 504f. The cam 500 may be constructed of metal (e.g., steel, aluminum, an alloy), a composite material (e.g., carbon fiber reinforced polymer), or any other rigid material.

The recessions 508 and 514 and the sloped wall portions partially surround the blades to constrain rotation of the blades but allow vertical movement of the blades. In particular, horizontal portions of the cam surface 504 (e.g., 504e and 504j) constrain the vertical movement of the rotor 312 and the blades 320 and 322. Vertical portions of the cam surface 504 (e.g., 504d and 504i) constrain the rotation of the rotor 312 and the blades 320 and 322. Sloped portions (e.g., 504b and 504g) constrain both vertical movement and rotation of the rotor 312. The cam surface 504 is rounded at the transitions between the sloped portions and the recessions 508 and 514 to help the blades drop into the recessions (i.e. at transitions 504a, 504c, 504f, and 504h).

In some flight rotor systems, the rotor and blades are consistently rotated in a same direction due to a motor applying torque in the same direction each time it is activated. When transitioning from the retracted position to the deployed position, the vertical portions of the cam surface 504 are sufficient to prevent rotation of the rotor and blades because they lie in the path of the blades when rotating in the same direction. When transitioning from the deployed position to the retracted position, cam followers (e.g., cam followers 316 and 326 at the root of each blade) contact the sloped portions of the cam surface 504, while the rotor and blades continue rotating due to inertia. For example, the cam followers can follow the sloped portions 504b and 504g of the cam surface 504 until they reach the recessions 508 and 514. The cam followers guide the root of each blade into one of the recessions 508 and 514 (e.g., where each cam follower contacts one of the portions 504e or 504i when nested).

The recessions 508 and 514 have an axis of alignment, e.g., a single line that passes through a center of both recessions at their narrowest point. The axis of alignment of the recessions 508 and 514 may be oriented along a prescribed axis. For example, the axis of alignment may align with an axis of forward flight of an aircraft (e.g., to align the blades with the axis of forward flight based on the blades being nested in the recessions, see, e.g., FIG. 2A). As another example, the axis of alignment may align with a longitudinal axis of a wing and/or a fuselage (e.g., to align the blades with the longitudinal axis of the wing and/or the fuselage based on the blade being nested in the recession, see, e.g., FIGS. 8 and 9). The examples of FIGS. 2A, 2B, 3A, 3B, 3C, 3D, 3E, and 3F are shown utilizing the cam 400 (as described in detail with respect to FIGS. 4A and 4B). However, in other variations on the examples of FIGS. 2A, 2B, 3A, 3B, 3C, 3D, 3E, and 3F the cam 500 replaces the cam 400.

Figure 6A:
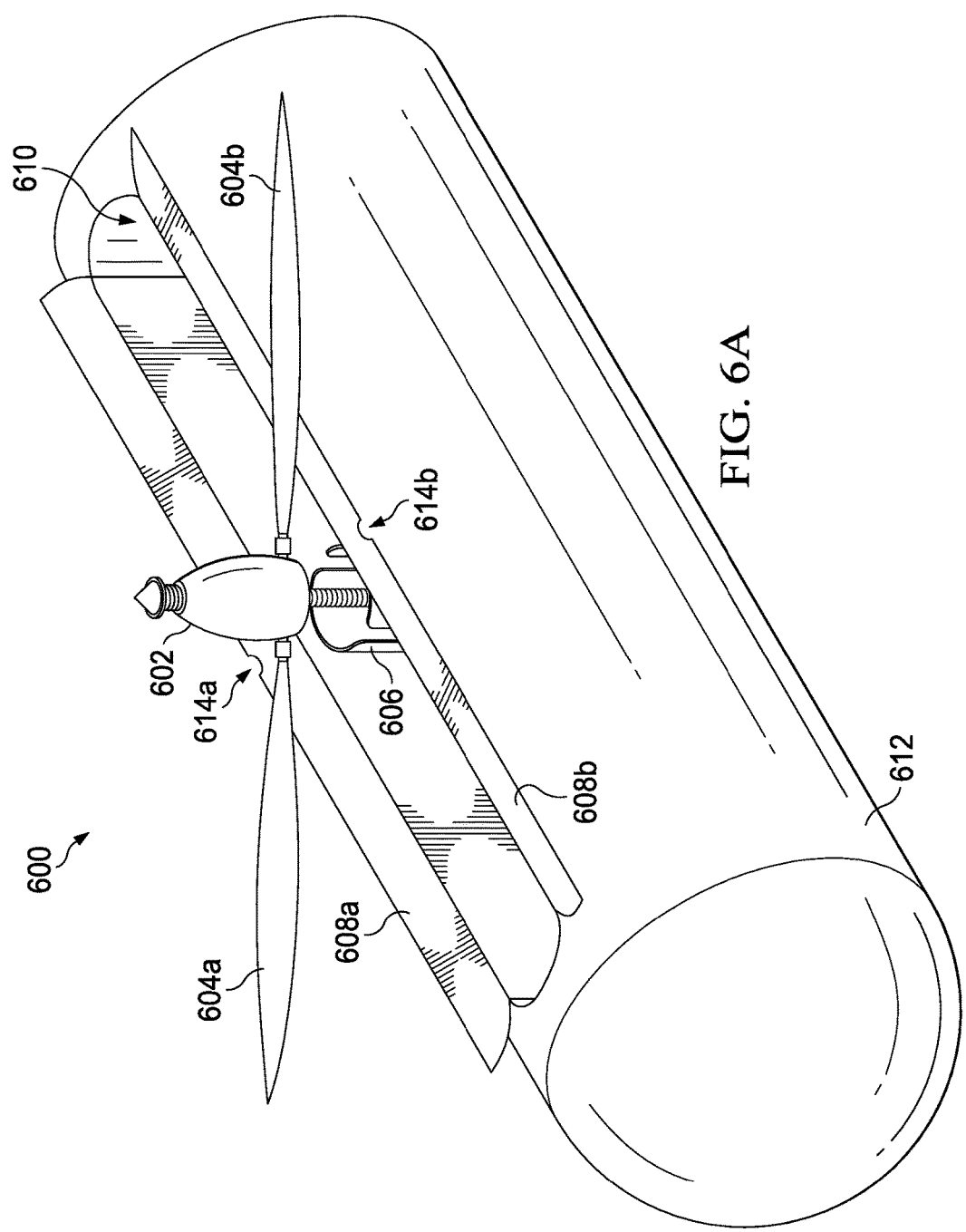
FIGS. 6A and 6B illustrate a flight rotor system retracted into and deployed from a cavity recessed into a surface of an aircraft.
Figure 6B:
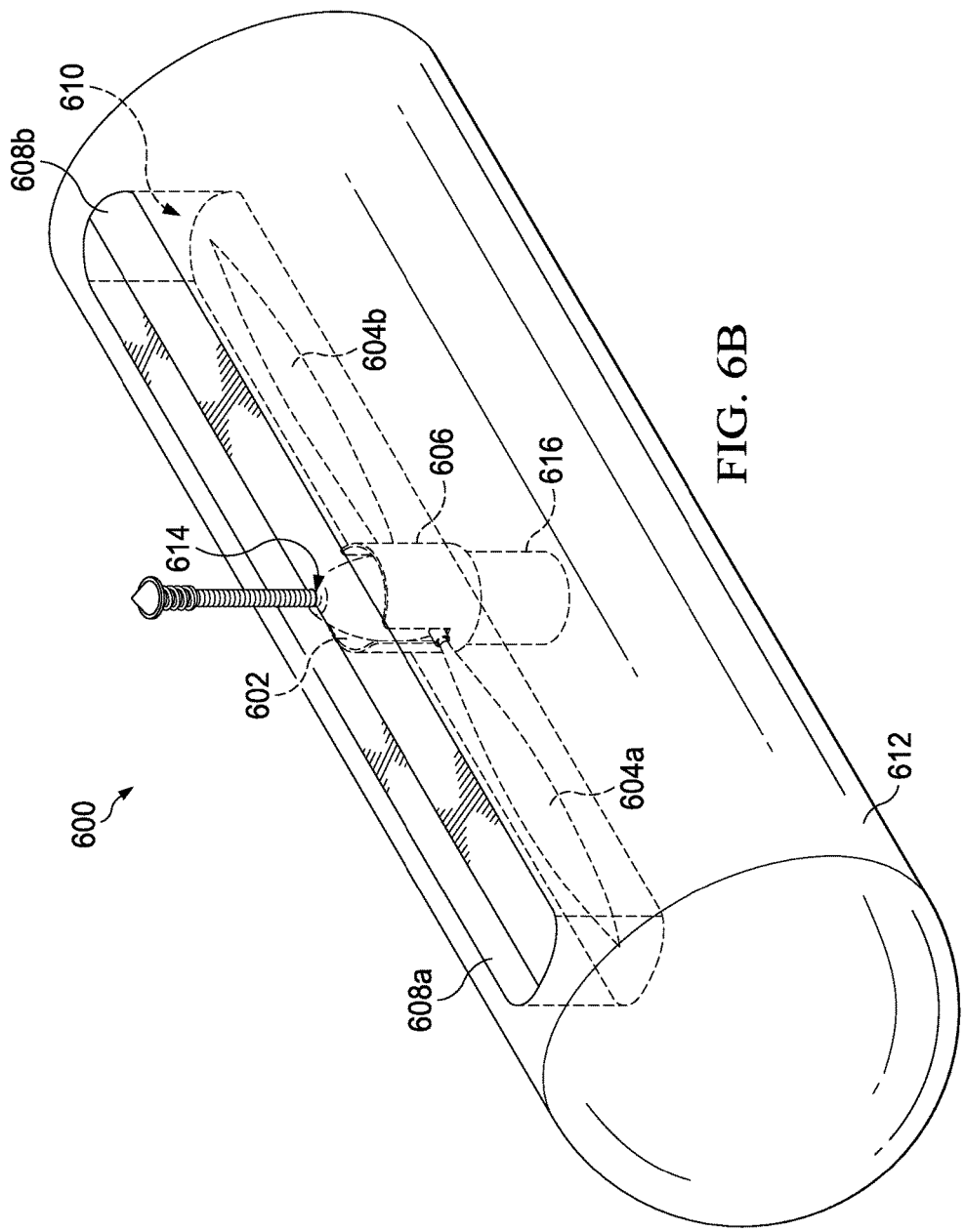

FIGS. 6A and 6B illustrate a system 600 in which a flight rotor system deploys from and retracts into a cavity of an aircraft. The system 600 comprises a portion 612 of an aircraft, a cavity 610 in a surface of the portion 612, a flight rotor system, and doors 608a and 608b. The portion 612 may be a portion of a fuselage, a wing, a boom, an empennage, or any other structure of the aircraft. The cavity 610 is recessed into a surface of the portion 612 of the aircraft. The flight rotor system of system 600 includes the components and operates as is described with respect to FIGS. 3A-3F; the description is not repeated here only for the purpose of brevity. The flight rotor system comprises, among other things, a rotor 602, blades 604a and 604b, a motor 616, and cam 606. The rotor 602 and the blades 604a and 604b deploy from the cavity 610 based on the blades 604a and 604b being withdrawn from nesting in recessions in the cam 606. The rotor 602 and the blades 604a and 604b retract into the cavity 610 based on the blades 604a and 604b being nested in the recessions in the cam 606. The doors 608a and 608b are operable to conceal or reveal the cavity 610 based whether the flight rotor system is deployed from or retracted into the cavity 610. The doors 608a and 608b comprise semicircular recessions 614a and 614b, which create an opening through which the shaft can pass while the doors are closed.

Turning to FIG. 6A, FIG. 6A illustrates the rotor 602 and the blades 604a and 604b deployed from the cavity 610. The doors 608a and 608b uncover the cavity 610 to allow the rotor 602 and the blades 604a and 604b to deploy from the cavity. The blades 604a and 604b are completely withdrawn from the recessions in the cam 606. In the deployed state, the motor 616 (not shown in FIG. 6A) applies torque to the shaft and, as a result, the rotor 602 and the blades 604a and 604b rotate to generate thrust for flight of the aircraft.

The flight rotor system of system 600 can transition from the deployed position (of FIG. 6A) to the retracted position (of FIG. 6B) in a manner as described with respect to FIGS. 2A-2F. The flight rotor system of system 600 can be repeatedly deployed and/or retracted by activating and deactivating the motor 616.

Turning to FIG. 6B, FIG. 6B illustrates the rotor 602 and the blades 604a and 604b retracted into the cavity 610. The rotor 602 is stowed in the cam 606 and the blades 604a and 604b are nested in the recessions in the cam 606. The recessions in the cam 606 force the blades 608a and 608b to align with a longitudinal axis of the cavity 610. Without the cam 606, the blades 608a and 608b may not align with the longitudinal axis of the cavity 610 (e.g., would stop at and arbitrary rotational position) and, as a result, may not retract into the cavity 610. The doors 608a and 608b doors cover the cavity 610 while the rotor 602 and the blades 604a and 604b are retracted into the cavity 610. The shaft protrudes through the opening 614 defined by the notches 614a and 614b in the doors 608a and 608b. Drag caused by the rotor 602 and the blades 604a and 604b is virtually eliminated based on them being retracted into the cavity 610, which can increase the maximum speed and the fuel efficiency the aircraft on which the system is deployed.

Figure 7A:
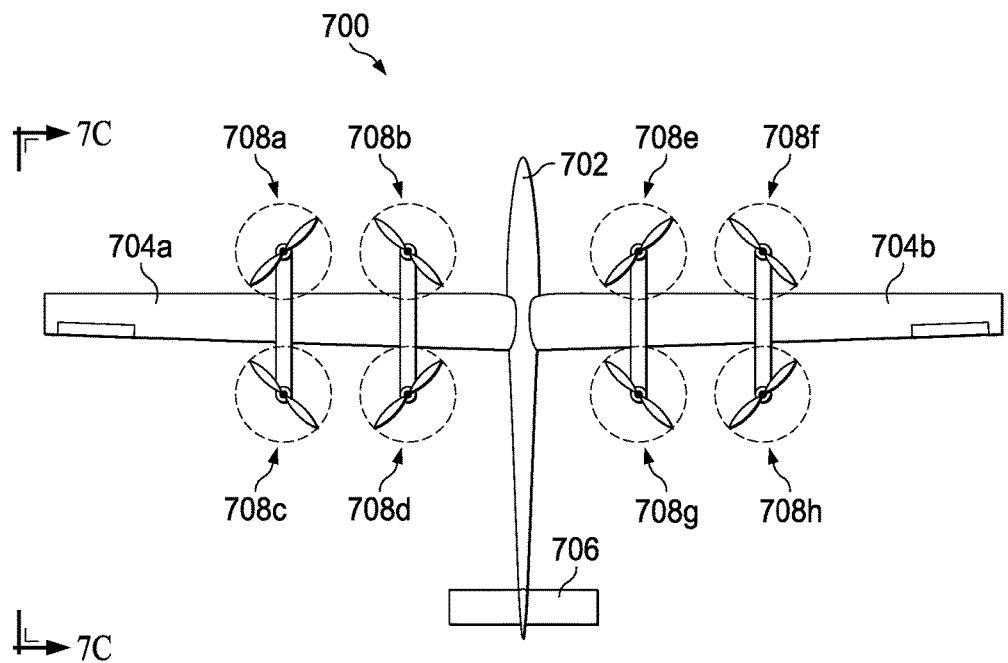
FIGS. 7A, 7B, 7C, 7D, 7E, and 7F illustrate various views of an aircraft including tilt rotors that are retractable and deployable according to the present specification.
Figure 7B:
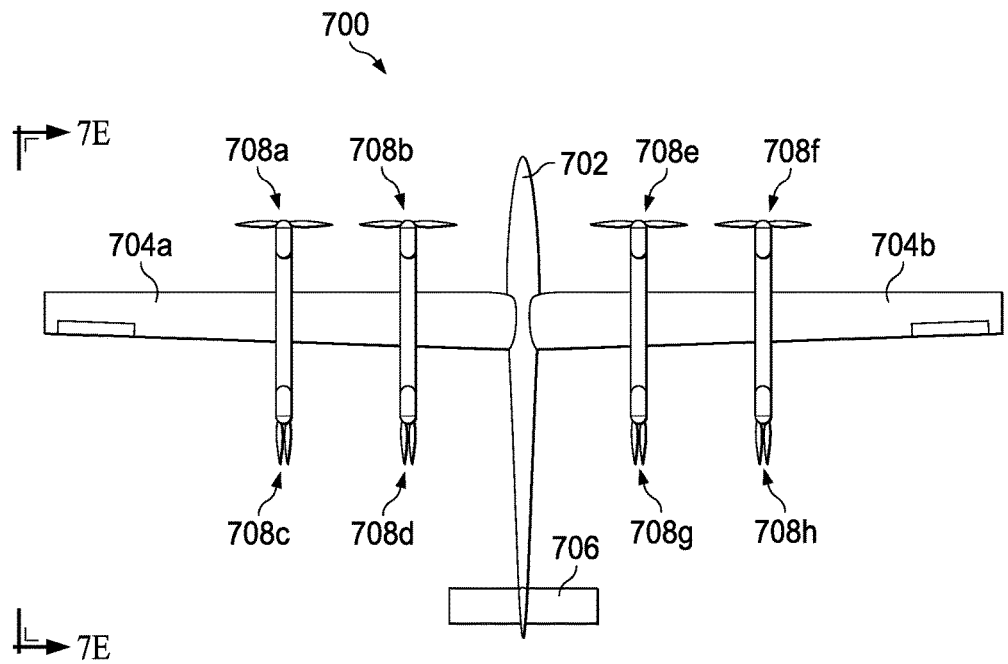

FIGS. 7A, 7B, 7C, 7D, 7E, and 7F illustrate various views of an aircraft 700, which includes tilt rotors that are retractable and deployable according to the present specification. FIGS. 7A and 7B illustrate plan views of the aircraft 700. FIGS. 7C, 7D, 7E, and 7F illustrate side views of the aircraft 700. The aircraft 700 comprises a fuselage 702, a left wing 704a, a right wing 704b, an empennage 706, and tilt rotors 708a, 708b, 708c, 708d, 708e, 708f, 708g, and 708h (referred to collectively as the tilt rotors 708). Each of the tilt rotors 708a, 708b, 708c, and 708d is supported by a boom extending from the left wing 704a. Each of the tilt rotors 708e, 708f, 708g, and 708h is supported by a boom extending from the right wing 704b. A tilt rotor can rotate between at least two different operational positions: one for forward flight and another for vertical flight. Each of the tilt rotors 708 is mounted on a rotational mechanism that rotates the tilt rotor between the forward flight position and the vertical flight position. Each of the tilt rotors on a forward edge of a wing (i.e., tilt rotors 708a, 708b, 708e, and 708f) is an implementation of a retractable and deployable flight rotor system of the present disclosure. In a particular example, each of the tilt rotors 708a, 708b, 708e, and 708f is identical to the flight rotor system 300 (i.e., as described with respect to FIGS. 3A-3F) and is mounted on the rotational mechanism to tilt between the forward and vertical flight positions. In another example, each of the tilt rotors 708a, 708b, 708e, and 708f is identical to the flight rotor system 300 except that the cam 400 is replaced with either the cam 500 (i.e., as described with respect to FIGS. 5A-5B) or the cam 1000 (i.e., as described with respect to FIG. 10 below).

Figure 7C:
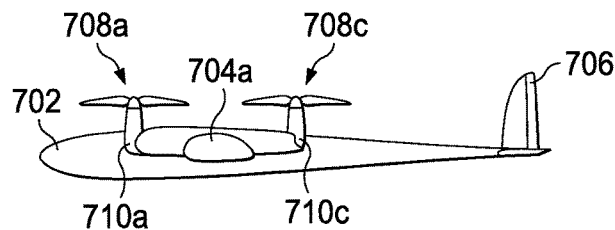
Figure 7D:
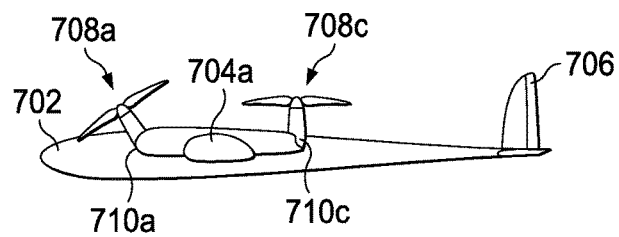

Turning to FIGS. 7A and 7C, FIG. 7A illustrates the aircraft 700 in vertical flight where all of the tilt rotors 708 are providing vertical thrust for vertical flight of the aircraft 700; FIG. 7C illustrates a side view of the aircraft 700 as depicted in FIG. 7A (as generally indicated by the view lines labeled "7C" in FIG. 7A). Turning to FIG. 7D, FIG. 7D illustrates a side view of the aircraft 700 in transition between vertical flight and forward flight (e.g., in transition between FIG. 7C and FIG. 7E). During the transition, each of the tilt rotors 708 move from the vertical flight position to the forward flight position. A rotational mechanism 710a rotates the tilt rotor 708a between the vertical flight position and the forward flight position. The tilt rotor 708a is illustrated about half-way through the transition. A rotational mechanism 710c rotates the tilt rotor 708c between the vertical flight position and the forward flight position. The tilt rotor 708c is illustrated still in the vertical flight position.

Figure 7E:
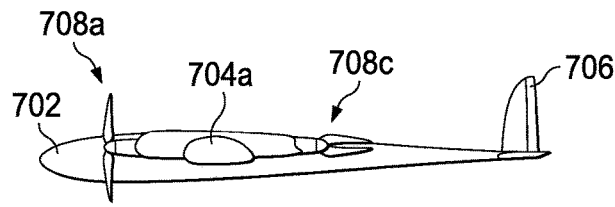

While thrust from all of the tilt rotors 708 may be needed for vertical flight of the aircraft 700, only a subset of the tilt rotors 708 may be needed for forward flight of the aircraft 700. Turning to FIGS. 7B and 7E, FIG. 7B illustrates the aircraft 700 in forward flight where half of the tilt rotors 708 are providing forward thrust for forward flight of the aircraft 700; FIG. 7E illustrates a side view of the aircraft 700 as depicted in FIG. 7B (as generally indicated by the view lines labeled "7E" in FIG. 7B). In the example of FIGS. 7B and 7E only thrust from the tilt rotors 708a, 708b, 708e, and 708f are needed for forward flight while thrust from the tilt rotors 708c, 708d 708g, and 708h is not needed. Thus, the tilt rotors 708a, 708b, 708e, and 708f are in the forward flight position providing forward thrust to the aircraft 700. The aft tilt rotors 708c, 708d 708g, and 708h are in the forward flight position but do not provide forward thrust to the aircraft 700. Since forward thrust from the aft tilt is not needed, blades on each of the tilt rotors 708b, 708c, 708g, and 708h fold about the rotor to reduce the drag caused by the blades.

Figure 7F:
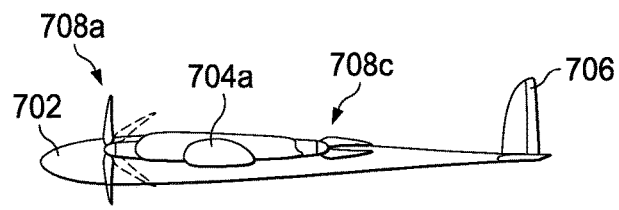

When any of the tilt rotors on the forward edge of the aircraft 700 are unused, the blades may fold around the edge of the boom on which they are supported if they are properly aligned with the boom. Turning to FIG. 7F, FIG. 7F illustrates a side view of the aircraft 700 where the tilt rotors 708a folds over the boom based on being aligned with the boom using a retractable and deployable flight rotor system of the present disclosure. In the example of FIG. 7F only thrust from the tilt rotors 708b and 708e are needed for forward flight while thrust from the tilt rotors 708a, 708c, 708d, 708f, 708g, and 708h is not needed. As before, the blades of each of the aft tilt rotors 708b, 708c, 708g, and 708h fold about the rotor to reduce the drag caused by the blades. However, the blades of each of the tilt rotors 708a and 708f can only fold over their supporting booms if they are vertically aligned. Each of the tilt rotors 708a, 708b, 708e, and 708f comprises a cam configured to vertically orient the blades of the rotor (when the blades are not in use), which enables the blades to fold over their supporting booms and reduce the drag created by the blades while the aircraft 700 is in forward flight. Because the blades of the tilt rotor 708a are vertically oriented, one blade can fold over the top of the boom and the other blade can fold over the bottom of the boom (as generally depicted by the dashed blades in FIG. 7F). While the blades fold in this example, in other examples, the blades are fixed and the cam is configured to horizontally orient the blades with a leading edge of a wing to reduce drag caused by the blades.

Figure 8:
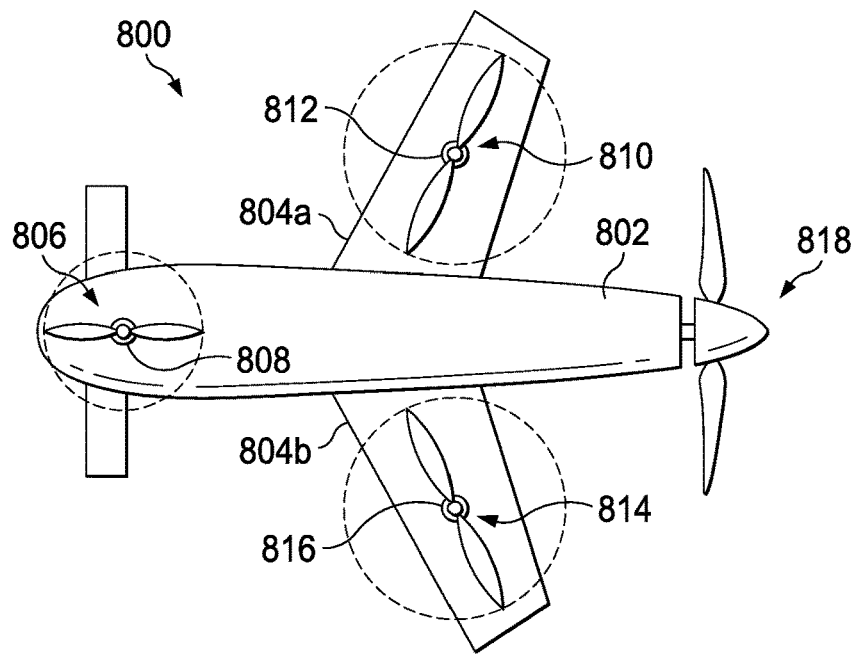
FIGS. 8 and 9 illustrate example aircraft, each including at least one retractable and deployable flight rotor system according to the present specification.
Figure 9:
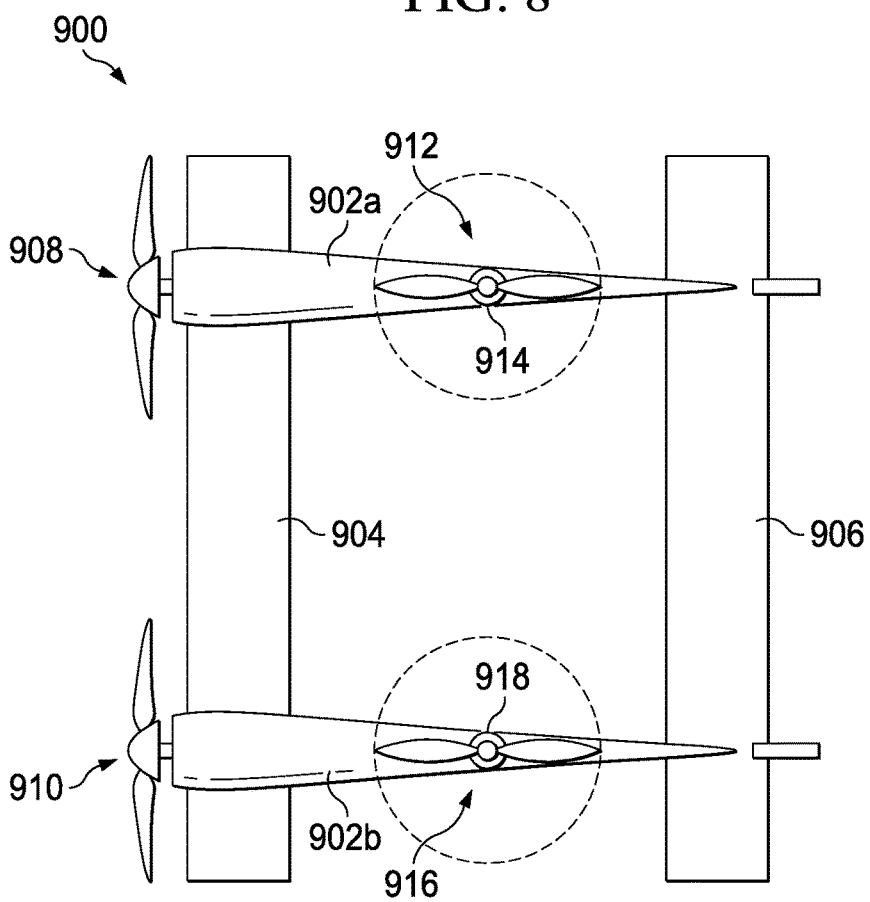

FIGS. 8 and 9 illustrate various aircrafts including a retractable and deployable flight rotor system according to the present specification.

Turning to FIG. 8, FIG. 8 illustrates an aircraft 800 in accordance with certain embodiments. In this example, the aircraft 800 is a vertical take-off and landing VTOL aircraft. The VTOL aircraft 800 comprises a fuselage 802, a left wing 804b, a right wing 804a. Each of the wings extend from the fuselage 802. The fuselage 802 is coupled to a forward thrust rotor 818. The forward thrust rotor 818 rotates blades to provide forward thrust to the VTOL aircraft 800 for forward flight. The VTOL aircraft 800 comprises three vertical thrust rotor assemblies, i.e., rotor assemblies 806, 810, and 814. Each vertical thrust rotor assembly provides vertical thrust to the VTOL aircraft 800 for vertical take-off and/or vertical landing. The left wing 804b supports the rotor assembly 814. The right wing 804a supports the rotor assembly 810. The fuselage 802 supports the rotor assembly 806. Each of the rotor assemblies 806, 810, and 814 is an implementation of a retractable and deployable flight rotor system of the present disclosure. In a particular example, each of the rotor assemblies 806, 810, and 814 is identical to the flight rotor system 300 (i.e., as described with respect to FIGS. 3A-3F). In another example, each of the rotor assemblies 806, 810, and 814 is identical to the flight rotor system 300 except that the cam 400 is replaced with either the cam 500 (i.e., as described with respect to FIGS. 5A-5B) or the cam 1000 (i.e., as described with respect to FIG. 10 below).

Each of the rotor assemblies 806, 810, and 814 comprises a cam configured to orient the blades of the rotor assembly with a specific axis of the VTOL aircraft 800. The blades align with the specific axis based on the blades being nested in recessions in the cam. The rotor assembly 806 comprises the cam 808. The cam 808 aligns the blades of the rotor assembly 806 with a longitudinal axis of the fuselage 802 (and the axis of forward flight of the VTOL aircraft 800), which reduces the drag created by the rotor assembly 806 while the VTOL aircraft 800 is in forward flight. The rotor assembly 814 comprises the cam 816. The cam 816 aligns the blades of the rotor assembly 814 with a longitudinal axis of the left wing 804b, which enables the rotor assembly 814 to retract into a cavity within the left wing 804b when not in use. The rotor assembly 810 comprises the cam 812. The cam 812 aligns the blades of the rotor assembly 810 with a longitudinal axis of the right wing 804a, which enables the rotor assembly 810 to retract into a cavity within the right wing 804a when not in use. The drag produced by the vertical thrust rotor assemblies during forward flight of the aircraft 800 is reduced due to the blades being aligned with the direction of forward flight or stowed within the wings.

Turning to FIG. 9, FIG. 9 illustrates an aircraft 900 in accordance with certain embodiments. In this example, the aircraft 900 is an unmanned aerial vehicle ("UAV") with vertical take-off and landing VTOL capabilities (i.e., a VTOL UAV). The VTOL UAV 900 comprises a left fuselage 902b, right fuselage 902a, a head wing 904, and an aft wing 906. The left fuselage 902b is coupled to a forward thrust rotor 910. The right fuselage 902a is coupled to a forward thrust rotor 908. The forward thrust rotors 910 and 908 rotate blades to provide forward thrust for forward flight of the VTOL UAV 900. The VTOL UAV 900 comprises two vertical thrust rotor assemblies, i.e., rotor assemblies 912 and 916. Each vertical thrust rotor assembly provides vertical thrust to the VTOL UAV 900 for vertical take-off and/or vertical landing. The left fuselage 902b supports the rotor assembly 916. The right fuselage 902a supports the rotor assembly 912. Each of the rotor assemblies 912 and 916 is an implementation of a retractable and deployable flight rotor system of the present disclosure. In a particular example, each of the rotor assemblies 912 and 916 is identical to the flight rotor system 300 (i.e., as described with respect to FIGS. 3A-3F). In another particular example, each of the rotor assemblies 912 and 916 is identical to the flight rotor system 300 except that the cam 400 is replaced with either the cam 500 (i.e., as described with respect to FIGS. 5A-5B) or the cam 1000 (i.e., as described with respect to FIG. 10 below).

Each of the rotor assemblies 912 and 916 comprises a cam configured to orient the blades of the rotor assembly with a specific axis of the VTOL UAV 900. The blades align with the specific axis based on the blades being nested in recessions in the cam. The rotor assembly 916 comprises the cam 918. The cam 918 aligns the blades of the rotor assembly 916 with a longitudinal axis of the left fuselage 902b (and an axis of forward flight of the VTOL UAV 900), which reduces the drag created by the rotor assembly 916 while the VTOL UAV 900 is in forward flight. The rotor assembly 912 comprises the cam 914. The cam 914 aligns the blades of the rotor assembly 912 with a longitudinal axis of the right fuselage 902a (and the axis of forward flight of the VTOL UAV 900), which reduces the drag created by the rotor assembly 912 while the VTOL UAV 900 is in forward flight. The cams aligning the blades with the direction of forward flight reduces drag produced by the vertical thrust rotor assemblies 912 and 916 during forward flight of the VTOL UAV 900.

Figure 10:
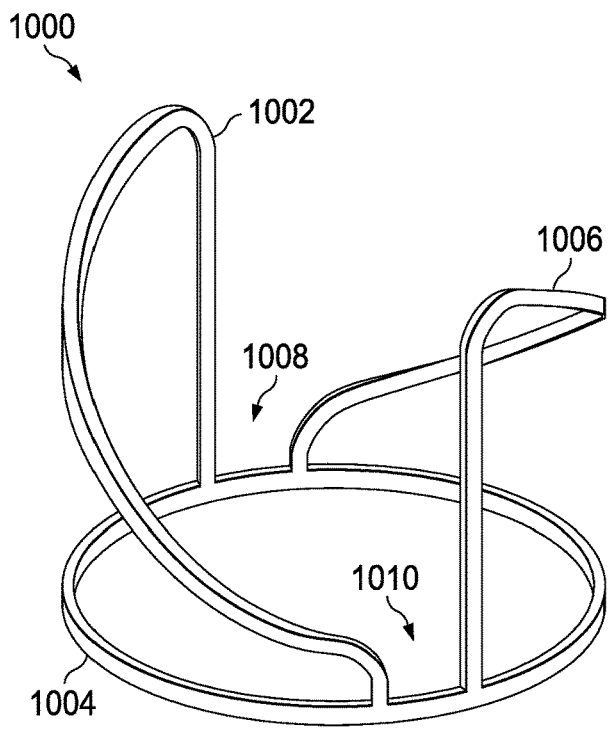
FIG. 10 illustrates details of yet another apparatus comprising a cam surface.

FIG. 10 illustrate details of a cam 1000 comprising a sloped cam surface constructed from wires. The cam 1000 comprises three wires 1002, 1004, and 1006. Each of the wires 1002, 1004, and 1006 is rectangular in cross section. Alternatively, the cross section of each wire may be, e.g., circular, triangular, or any other shape. The wire 1004 forms a circular base upon which the wires 1002 and 1006 are supported. Each of the wires 1002 and 1006 is sloped from one vertical side to the other vertical side, which creates the sloped cam surface to guide the motion of a rotor and blades (e.g., similar to that described with respect to FIGS. 5A and 5B). The space between the wires 1002 and 1006 defines the recessions 1008 and 1010 in which a blade can nest. The wires of the cam 1000 use less material than the walls of the cam 500 (i.e., of FIGS. 5A and 5B) and, therefore, the cam 1000 is lighter than the cam 500 (e.g., when both are made from the same material). Moreover, because the wires of the cam 1000 have less surface area than the walls of the cam 500, the cam 1000 produces less drag than the cam 500. In some examples, the cam 1000 is produced by bending each of the wires into shape and attaching them together to form the completed cam as depicted in FIG. 10. In other examples, the cam 1000 is produced by punching shapes from a planar material (e.g., sheet metal, plastic) and rolling the punched sheet into a cylindrical enclosure. In yet other examples, the cam 1000 is produced by molding the material into the final shape of the cam 1000 (e.g., injection molding, vacuum molding, and the like). A variation of the cam 400 (of FIGS. 4A and 4B) can be similarly produced using wires and/or punched sheet metal to reduce its weight and/or surface area.

The examples of FIGS. 2A, 2B, 3A, 3B, 3C, 3D, 3E, and 3F are shown utilizing the cam 400 (as described in detail with respect to FIGS. 4A and 4B). However, in other variations on the examples of FIGS. 2A, 2B, 3A, 3B, 3C, 3D, 3E, and 3F the cam 1000 replaces the cam 400.

Figure 11:
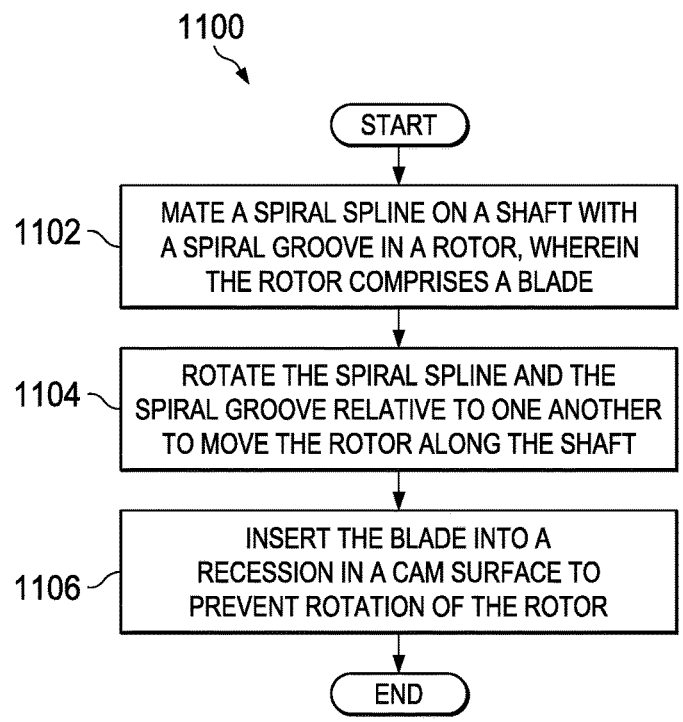
FIG. 11 illustrates a flowchart for an example of retracting and deploying a flight rotor system.

FIG. 11 illustrates a flowchart 1100 for an example embodiment of retracting and deploying a flight rotor system on an aircraft. Flowchart 1100 may be implemented, in some embodiments, using the flight rotor systems described throughout this disclosure (e.g., FIGS. 2A-2B, 3A-3F, 4A-4B, 5A-5B, 6A-6B, 7A-7F, 8, 9, and 10).

The flowchart may begin at block 1102 by mating a spiral spline on a shaft with a spiral groove in a rotor. The rotor comprises at least one blade. The spiral spline is a raised spline that is spirally disposed about the shaft along its length. The spiral groove is a groove that is spirally disposed about a hole in the rotor. The shaft may fit in the hole on the rotor to interlock the spiral spline with the spiral groove.

The flowchart may then proceed to block 1104 by rotating the spiral spline and the spiral groove relative to one another to move the rotor along the shaft. Such relative rotation may be caused by: (1) rotating the shaft while the rotor is stationary, (2) rotating the rotor while the shaft is stationary, (3) simultaneously rotating the shaft and the rotor in opposite directions, and/or (4) simultaneously rotating the shaft and the rotor in a same direction but each at a different rotational velocity. The relative rotation between the spiral spline and the spiral groove may be in a first rotational direction, which causes the rotor to move along the shaft in a first axial direction, or in a second rotational direction, which causes the rotor to move along the shaft in a second axial direction.

The flowchart may then proceed to block 1106 to insert a blade (of the at least one blade coupled to the rotor) into a recession in a cam surface to prevent rotation of the rotor. The blade being inserted into (e.g., nested in) the recession allows linear movement of the rotor along the shaft though rotation of the rotor about the shaft is prevented. The blade may align with a prescribed axis of an aircraft based on being nested in the recession. The relative rotation (between the spiral spline and the spiral groove) being in the first rotational direction causes the blade to enter the recession (to advance toward the retracted position, e.g., as is illustrated FIGS. 3B and 3C). Likewise, the relative rotation being in the second rotational direction causes the blade to withdraw from the recession (to advance toward the deployed position, e.g., as is illustrated FIGS. 3D and 3E).

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An apparatus comprising:
a shaft comprising a spiral spline along a length of the shaft;
a rotor comprising a blade extending from the rotor and a tubular hole extending into the rotor, the tubular hole comprising a spiral groove configured to mate with the spiral spline on the shaft, wherein relative rotation between the spiral spline and the spiral groove causes the rotor to linearly move along the shaft; and
a cam surface comprising a recession, wherein the blade nesting in the recession constrains rotation of the rotor about the shaft and allows linear movement of the rotor along the shaft.

2. The apparatus of claim 1, wherein the blade aligns with an axis of forward flight of an aircraft based on the blade being nested in the recession.

3. The apparatus of claim 1, wherein the relative rotation between the spiral spline and the spiral groove comprises:
relative rotation in a first rotational direction about the shaft causing the rotor to move along the shaft in a first axial direction, and
relative rotation in a second rotational direction about the shaft causing the rotor to move along the shaft in a second axial direction; and
wherein the first rotational direction and the second rotational direction are opposite one another, and the first axial direction and the second axial direction are opposite one another.

4. The apparatus of claim 3, further comprising:
a head located at an end of the shaft; and
a spring located between the rotor and the head, the spring configured to stop the linear movement of the rotor along the shaft.

5. The apparatus of claim 4, wherein:
the rotor is configured to compress the spring based on the rotor moving along the shaft in the first axial direction, and
the spring is configured to apply a force to the rotor in the second axial direction based, at least in part, on the spring being compressed; and
wherein the rotor is configured to move along the shaft in the second axial direction based, at least in part, on the spring applying a force to the rotor in the second axial direction.

6. The apparatus of claim 3, wherein the spiral groove is configured to drive nesting the blade in the recession based on the relative rotation between the spiral spline and the spiral groove being in the second rotational direction about the shaft; and
wherein the spiral spline is configured to drive withdrawal of the blade from nesting in the recession based on the relative rotation between the spiral spline and the spiral groove being in the first rotational direction about the shaft.

7. The apparatus of claim 1, further comprising a cam follower positioned about a base of the blade, wherein the cam follower is configured to follow a profile of the cam surface as the rotor rotates about the shaft.

8. An aircraft comprising:
a motor configured to apply torque to a shaft,
the shaft comprising a spiral spline along a length of the shaft;
a rotor comprising a blade extending from the rotor and a tubular hole extending into the rotor, the tubular hole comprising a spiral groove configured to mate with the spiral spline on the shaft, wherein relative rotation between the spiral spline and the spiral groove causes the rotor to linearly move along the shaft; and
a cam surface comprising a recession, wherein the blade nesting in the recession constrains rotation of the rotor about the shaft and allows linear movement of the rotor along the shaft.

9. The aircraft of claim 8, wherein the blade aligns with an axis of forward flight of the aircraft based on the blade being nested in the recession.

10. The aircraft of claim 8, wherein the relative rotation between the spiral spline and the spiral groove comprises:
relative rotation in a first rotational direction about the shaft causing the rotor to move along the shaft in a first axial direction, and relative rotation in a second rotational direction about the shaft causing the rotor to move along the shaft in a second axial direction; and wherein the first rotational direction and the second rotational direction are opposite one another, and the first axial direction and the second axial direction are opposite one another.

11. The aircraft of claim 8, wherein the spiral groove is configured to drive nesting the blade in the recession based on the relative rotation between the spiral spline and the spiral groove being in a second rotational direction about the shaft; and wherein the spiral spline is configured to drive withdrawal of the blade from nesting in the recession based on the relative rotation between the spiral spline and the spiral groove being in a first rotational direction about the shaft.

12. The aircraft of claim 8, further comprising:

a cavity recessed into a surface of the aircraft, wherein the rotor retracts in the cavity based on the blade being nested in the recession and the rotor deploys from the cavity based on the blade being withdrawn from nested in the recession; and at least one door configured to, at least in part, cover the cavity while the rotor is retracted in the cavity and to uncover the cavity to allow the rotor to deploy from the cavity.

13. The aircraft of claim 8, wherein the aircraft comprises an unmanned aerial vehicle.

14. The aircraft of claim 8, wherein the rotor comprises one selected from the group consisting of a main rotor, a tilt rotor, a tail rotor of the aircraft.

15. A method comprising:

mating a spiral spline on a shaft with a spiral groove in a tubular hole of a rotor, wherein the rotor comprises a blade;

rotating the spiral spline and the spiral groove relative to one another to linearly move the rotor along the shaft; and stopping rotation of the rotor about the shaft based on the blade nesting in a recession in a cam surface, wherein the blade being nesting in the recession allows linear movement of the rotor along the shaft.

16. The method of claim 15, wherein the blade being nesting in the recession aligns the blade with an axis of forward flight of an aircraft.

17. The method of claim 15, further comprising stopping the linear movement of the rotor along the shaft and the relative rotation between the spiral spline and the spiral groove, wherein the stopping causes the rotor and the shaft to synchronously rotate.

18. The method of claim 15, wherein the relative rotation between the spiral spline and the spiral groove comprises:

relative rotation in a first rotational direction about the shaft causing the rotor to move along the shaft in a first axial direction, and relative rotation in a second rotational direction about the shaft causing the rotor to move along the shaft in a second axial direction; and wherein the first rotational direction and the second rotational direction are opposite one another, and the first axial direction and the second axial direction are opposite one another.

19. The method of claim 18, further comprising:

compressing, by the rotor, a spring based on the rotor moving along the shaft in the first axial direction; and applying, by the spring, a force to the rotor in the second axial direction based on the spring being compressed, wherein the rotor moves along the shaft in the second axial direction based, at least in part, on the spring applying the force to the rotor in the second axial direction.

20. The method of claim 18, further comprising:

nesting the blade into the recession based on the relative rotation between the spiral spline and the spiral groove being in the second rotational direction about the shaft; and withdrawing the blade from the recession based on the relative rotation between the spiral spline and the spiral groove being in the first rotational direction about the shaft.

* * * * *